United States Patent [19]
Seymour et al.

[11] Patent Number: 6,141,454
[45] Date of Patent: Oct. 31, 2000

[54] METHODS FOR DATA COMPRESSION AND DECOMPRESSION USING DIGITIZED TOPOLOGY DATA

[75] Inventors: Leslie G. Seymour, Barrington, Ill.; Sam Daniel, Tempe; Kevin Buettner, Fountain Hill, both of Ariz.

[73] Assignee: Motorola, Schaumburg, Ill.

[21] Appl. No.: 08/742,299

[22] Filed: Nov. 1, 1996

[51] Int. Cl.[7] .................................................. G06K 9/00
[52] U.S. Cl. ......................................... 382/243; 382/108
[58] Field of Search .................................... 382/126, 106, 382/108, 109, 113, 114, 154, 181, 190, 192, 195, 197, 199, 201, 202, 203, 204, 209, 217, 224, 232, 233, 235, 241, 242, 243, 282, 284, 285, 286, 293, 307, 308, 149, 240; 358/426; 345/348, 346, 349, 355

[56] References Cited

U.S. PATENT DOCUMENTS

| | | | |
|---|---|---|---|
| 4,729,127 | 3/1988 | Chan et al. | 382/56 |
| 4,845,651 | 7/1989 | Aizawa et al. | 382/285 |
| 4,928,313 | 5/1990 | Leonard et al. | 382/8 |
| 5,058,186 | 10/1991 | Miyaoka et al. | 382/154 |
| 5,216,726 | 6/1993 | Heaton | 382/56 |
| 5,386,507 | 1/1995 | Teig et al. | 395/161 |

FOREIGN PATENT DOCUMENTS 0 394 517 B1   4/1989   European Pat. Off. ........ G01C 21/22

OTHER PUBLICATIONS

"An Interpolation and Compaction Technique for Gridded Data" by David L. Cozart, Jun. 27, 1983 Airforce Office of Scientific Research. Grant No. AFOSR–82–0166. Bolling AFB, DC, 20332. No Page #.

*Primary Examiner*—Leo H. Boudreau
*Assistant Examiner*—Bijan Tadayon
*Attorney, Agent, or Firm*—Michael L. Smith

[57] ABSTRACT

A digitized topology data compression and decompression method provides the digitized topology data of a collection of segments connected to each other via nodes. The method forms at least one composite line representing a chain of connected segments, which reduces an overall number of lines needed to represent the collection of segments and where each composite line has two end points at known coordinates, resulting in compression of the topology data. The method further represents each composite line by its respective end point coordinates. Next, the method enrolls each composite line into one of at least two sets of composite lines for minimizing a number of intersections between each of the composite lines within each of the sets of composite lines. Finally, the method reconstructs the nodes at a decompression time by calculating coordinates of intersecting composite lines belonging to different sets of composite lines.

16 Claims, 26 Drawing Sheets

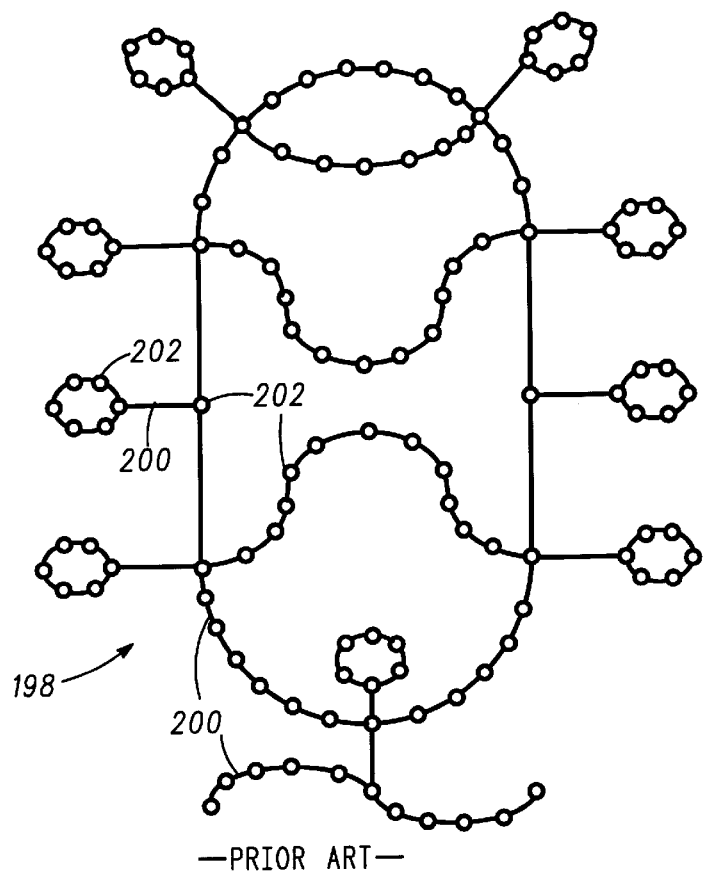
*FIG.14* —PRIOR ART—
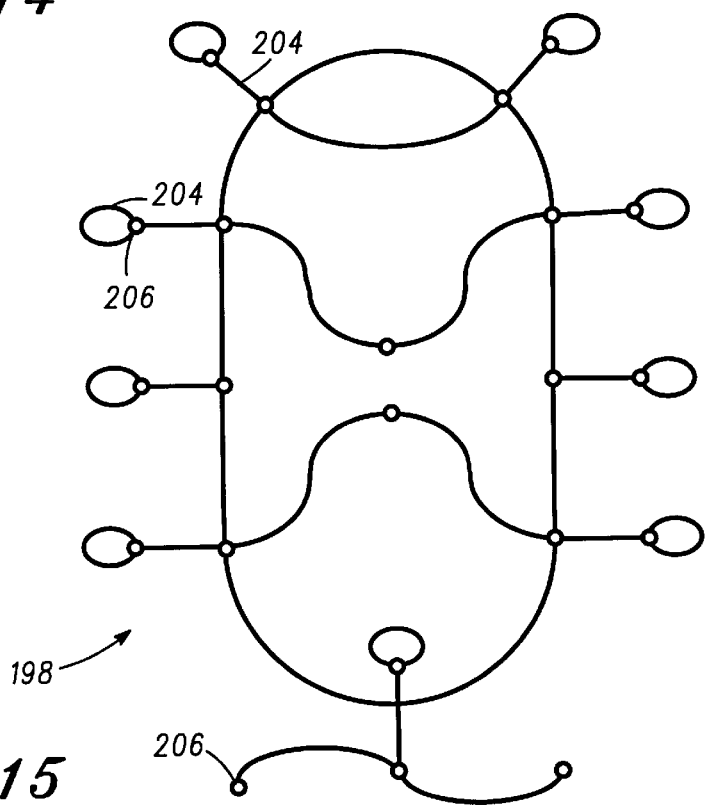
*FIG.15*

METHODS FOR DATA COMPRESSION AND DECOMPRESSION USING DIGITIZED TOPOLOGY DATA

FIELD OF THE INVENTION

This invention is generally directed to the field of Geographic Information Systems (GIS), and specifically to the storage and processing of digitized topology data in mobile, embedded computing devices, and to the transmission of such data to remote sites.

BACKGROUND OF THE INVENTION

The storage and transmission of high volumes of digitized road-map or other topology data poses several challenges in designing embedded product and network architectures for mobile and distributed computing.

First, the high volumes of data needed may limit the size of the mapped geographic area to be stored and distributed on data storage media. This is an important factor, considering the high cost of large semiconductor memory and the mechanical limitations of using devices with rotating media in a mobile environment.

Second, downloading digitized road-map data from a remote central site to a mobile device poses another limitation because of the high transmission cost through conventional communications channels such as a cellular telephone network.

Data compression can alleviate these limitations. It can minimize storage and retrieval delay of desired road-map data. Uncompressed road-map data may be stored in mass-storage media such as hard disk, compact disk, or tape. When a certain block of such data is downloaded for processing by an embedded system, the central processing unit (CPU) on the embedded system is likely to be idle during much of the search and transfer time required. If the road-map data on the storage medium were to be compressed by a certain factor, the block of such data would be commensurably smaller in size, and the search for and transfer time of these data to the embedded system would be reduced. During the shorter duration time of the block of compressed road data, the otherwise idle CPU can be used to carry out the decompression of the data, provided the CPU is of sufficient computational capacity. Thus, otherwise idle, disk-bound CPU cycles can be traded for reduced storage, search, and data transfer times and costs, resulting in a natural balance between data handling and computation. Data compression can result in savings in semiconductor memory and in transmission bandwidth. These savings can offset the possible extra cost of CPU-cycles for decompression. In the prior art, a road line is typically approximated by a sequence of linear road segments. These road segments are usually represented by data structures that include at least two pairs of position coordinate values, one pair for each end of the road segment. Optimization in memory usage is achieved by:

minimizing the length of the fields used for storing the binary coordinate values. This sacrifices some precision, which is tolerable as long as the fields do not impact proper and correct operation of the applications accessing the digitized road-map data;

defining the position coordinates relative to some local reference position. This reference position is usually associated with a selected geographical area. It is well known that road map coordinates relative to a reference position can be encoded in shorter data fields without sacrificing any precision. Such representations of road-map coordinate data have been reported by commercial map database vendors, including Navtech and Etak.

There exist other road-map data compression devices and methods, which exploit repetitive bit patterns in unstructured binary data, build a dictionary of representative repetitive patterns, and then replace each instance of an observed repetitive pattern with the corresponding index of its closest representative in the dictionary. This approach is commonly referred to as the Lempel-Ziv compression. Such methods make no use of known characteristics about the structure of the road-map data, such as map topology and road attributes; consequently, their effectiveness is limited. Compression ratios attained by such methods typically range from 2 to 3, and sometimes they are even lower. Another disadvantage of the Lempel-Ziv method is that the compressed data it produces cannot always be accessed directly by a particular application, because the orthogonal substitution of binary patterns may prevent the application from recognizing meaningful structures. For example, the Lempel-Ziv compression may replace a binary pattern, the first part of which is a portion of a coordinate value and the second part of which is a partial road attribute value. If the whole pattern is replaced with a single index value, neither the coordinate value nor the road attribute value can be recognized without running the appropriate decompression algorithm.

In general, compressed data has to be decompressed in its entirety before an application can search for the desired portion of the map data. This requirement may increase the computational cost of decompression, as well as the decompression buffer size. Otherwise, an alternative approach could be used to perform a meaningful partitioning of the map data into parcels and then, to perform a Lempel-Ziv compression on each parcel separately. It could be very difficult to anticipate an optimal partitioning of the map data because each application may access the data in a different and unpredictable manner. Examples of such applications are map-matching algorithms that track the movement of a vehicle along road network, route-planning algorithms or map display programs. The partitioning could also further limit the compression ratio.

With Huffmann encoding, data values are stored in data fields of varying lengths, thus realizing a savings in total storage. Frequent and redundant data values are encoded in shorter fields, while rarely used data values require longer fields. No prior art work made significant use of Huffmann encoding for road-map data compression.

In the prior art, attempts have been made to utilize the knowledge of the road line shapes for compression purposes. Kasser, in German patent DE 68907403 assigned to Bosch GmbH, replaced the linear approximation of route segments by curved segments defined by approximate radii of curvature. However, many non-linear road segments have complex shapes which could be much more efficiently encoded if the fixed radius curvature was not the only repeatedly used type of shape for compression. So, the practicality of Kasser approach is limited.

In European Patent Application Publication number 0 219 930, White and Loughmiller of Etak, Inc. disclosed another solution whereby the mapped area is split into pieces called "carriers" along natural boundary lines, in order to minimize the number of cases when a road line had to span several, separately represented map areas. They defined a model for a hierarchical nesting of these mapped areas which, unfortunately, can be conveniently and efficiently applied only for specific and limited topologies.

In U.S. Pat. No. 4,729,127, Chan used techniques for compressed representation of cultural terrain features such as rivers, lakes, and natural rock-formations as well as man-made cultural features such as roads, towns, and significant structures on three-dimensional map surfaces in order to aid aircraft and other vehicle navigation. Chan uses differential encoding to identify subsequent points on a line. This technique, however, is not effective for compressing complex networks of intersecting road lines of a variety of shapes.

Another technique involving interpolation of three-dimensional surfaces was published by Cozart, in the report AFOSR-TR-83-1333 of the Department of Mathematics & Computer Science, The Citadel, Mathematical & Information Sciences Directorate, Air Force Office of Scientific Research. Cozart derived bicubic polynomials to represent the terrain surface over small subgrids. He defined a rectangular grid with a constant grid spacing that yielded a number of data points on the vertical and horizontal boundary of a square subgrid. The elevation data on the boundary line was then interpolated to extend it smoothly into the subgrid.

In U.S. Pat. No. 5,216,726, Heaton used a token to signify that the coordinates of similar polygons are all separated by a given distance. He also used a data compression technique based on the observation that circuits were comprised of arrays of similar polygonal shapes having the same orientation. Furthermore, he eliminated the redundancy in representing the coordinates of the vertices of square shapes by replacing a repeated coordinate value for two adjacent vertices with a single value and a special token. Heaton reduced the data field length for representing the coordinate position of a vertex of a polygon by replacing the distance between the vertex and a common reference point with a relative distance value between the vertices of two adjacent polygons. Furthermore, common adjacent distances or delta values were also represented by special tokens. Heaton's invention is restricted to very specific and limited types of shapes and repetitions. It has more significance in the domain of integrated circuit design with a higher degree of regularity in its topology than the domain of road maps or similar structures.

The above methods do not contribute significantly to the compression efficiency of road-map data. A more effective approach employing a combination of efficient compression and decompression techniques would be of great value to the envisioned objectives of digitized road map processing. More efficiently eliminating much of the inherent redundancy in the topology and attributes that characterize road-map data would provide better compression than is now available. Effectively decompressing the compressed road-map data and reconstructing a faithful reproduction of the original road-map data, would significantly contribute to the design and deployment of more effective and economically affordable embedded road-map data processing subsystem architectures.

BRIEF DESCRIPTION OF THE DRAWINGS

FIG. 14 is an illustration of the use of a straight line approximation of a road map in accordance with the present invention;

FIG. 15 is an illustration of the use of shape type representation of a road map in accordance with the present invention;

FIG. 21 is a flowchart of a step of the method of FIG. 19;

Figure 1:
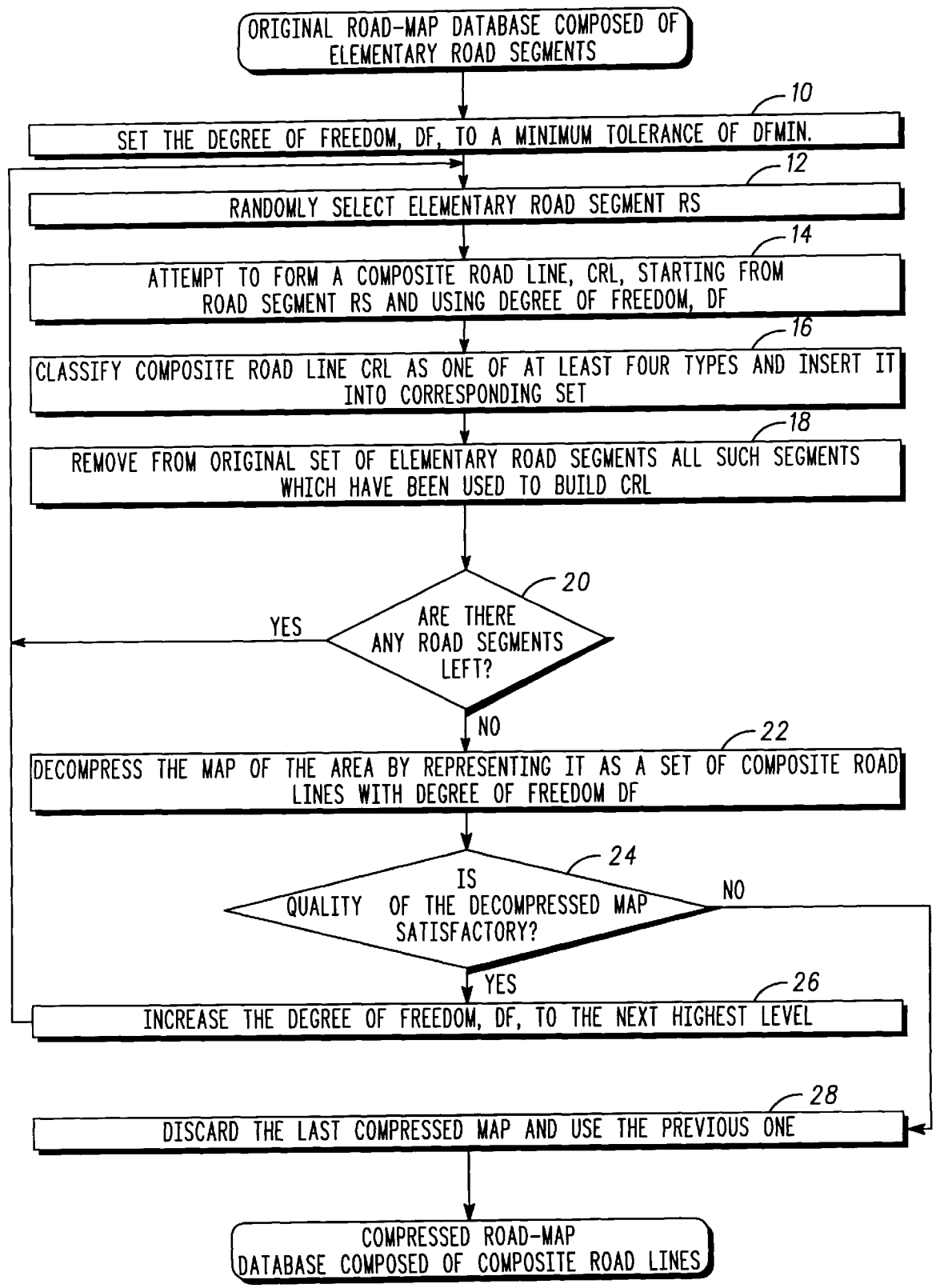
FIG. 1 is a flowchart of a method in accordance with the present invention.

DETAILED DESCRIPTION OF A PREFERRED EMBODIMENT 1.0 Forming Composite Road-Lines with Implicit Intersections The flow-chart of FIG. 1 illustrates a high-level method for compressing the essential information of the topology of a road network. Digitized road map data of a road network is provided as a collection of road segments connected to each other via nodes, wherein, generally, each node connects at least two adjacent road segments. The exception is a terminal segment, where one or both nodes do not connect to any other segment.

Sequences or chains of connected road segments are combined into single, composite road segments or composite road lines, thus reducing the overall number of road segments needed to represent the mapped area. The composite road segments are typically defined by the coordinates of their end points. All intermediate nodes in the original chain of connected segments from which the composite segment was derived are eliminated from storage. In other words, the formation of composite segments eliminates the need to explicitly specify the nodes or intersections of the road network in terms of position coordinates. In this sense, the set of composite segments represents compressed road-map data. The missing nodes may be numerically derived by mathematically calculating the intersections among the composite road segments during decompression.

It is also noted that a given road-map area is preferably subdivided into manageably-sized parcels to minimize buffer capacity for both compression and decompression. Accordingly, the compressed road-map data consists of a collection of composite road lines that fall within the parcel; the uncompressed data consists of the derived road-map segments determined from the calculated intersections among the composite road lines and their end points. The subdivision into parcels is based on several criteria, including geographical size, number of composite road lines required to span the parcel, and the use of natural boundary road lines to limit the fragmentation of composite road lines among adjacent parcels, as is the case in prior art published in White and Loghmiller's patent. Parcels provide an effective means of road-map data localization based on the geographical region of interest and as dictated by the particular application being employed.

FIG. 1 illustrates the high level process for converting the original uncompressed road-map database of elementary road segments of a given geographical area, such as a parcel, to a compressed version involving composite road lines built from a plurality of interconnected road segments.

Step 10 begins by setting the degree of freedom, DF, to a predetermined minimum tolerance value, DFmin DF determines the tolerated heading change among the connected elementary road segments, or simply road segments, which are to comprise any one of a plurality of composite road lines which will span the road-map network of the given parcel.

A given composite road line is built by starting with a road segment, RS, randomly selected from the uncompressed database. This is done in Step 12. Step 14 attempts to build a given composite road line, CRL, by starting with the randomly selected segment from Step 12 and subsequently adding interconnected road segments from the original road-map database, while conforming to the DF tolerance value set in Step 10. Step 14 is illustrated in detail in FIG. 2.

In order to reduce the computational load for decompression, involving the numerical calculation of the intersections among the composite road lines representing a given parcel, each such road line, CRL, is classified and enrolled into one of four distinct sets, such that lines within at least two of such sets do not intersect one another. In other words, each of at least two sets contains composite road lines which do not intersect one another, thus eliminating the need for unnecessary computation. This classification process of composite road lines is carried out in Step and illustrated in detail in FIG. 3. Step 18 removes from the original uncompressed road-map database the road segments that were used to build up each composite road line, CRL. Step 20 checks if there are any road segments left in the uncompressed database. If there are road segments remaining, the process loops back to Step 12; otherwise, the process continues on to Step 22.

Step 22 constitutes a preliminary decompression of the original road-map database in terms of the composite road lines derived with the given degree of freedom, DF. Step 24 determines if the quality of the decompressed road-map database is satisfactory. This determination is preferably done by actually decompressing the compressed data and checking that no useful road-map information is missing or misrepresented in the reconstructed road-map database of the given parcel. The details of this evaluation are illustrated below in conjunction with FIG. 9.

If the decompressed road-map is of satisfactory quality, Step increases the degree of freedom value, DF, to a next highest level and loops back to Step 12 to produce a more liberal and more efficient compression. This process is repeated until the answer to Step 24 is no, at which point, Step 28 discards the current compressed road-map database and adopts the previous one. This iterative process is designed to produce a maximally compressed map by allowing the maximum tolerable degree of freedom, DF, which preserves all useful information at an acceptable level of quality.

Figure 2A:
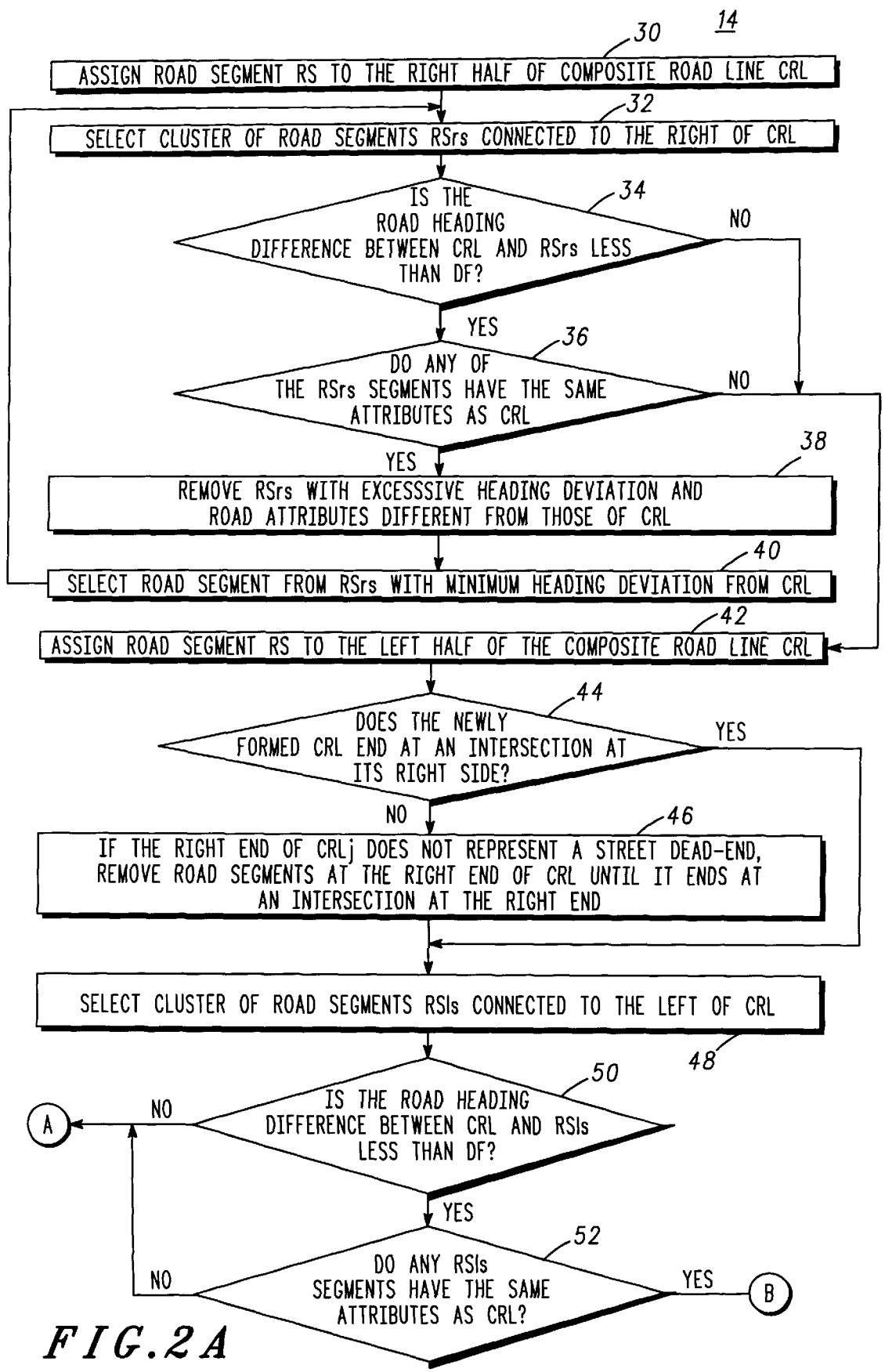
FIG. 2 is a flowchart of one of the steps of FIG. 1.
Figure 2B:
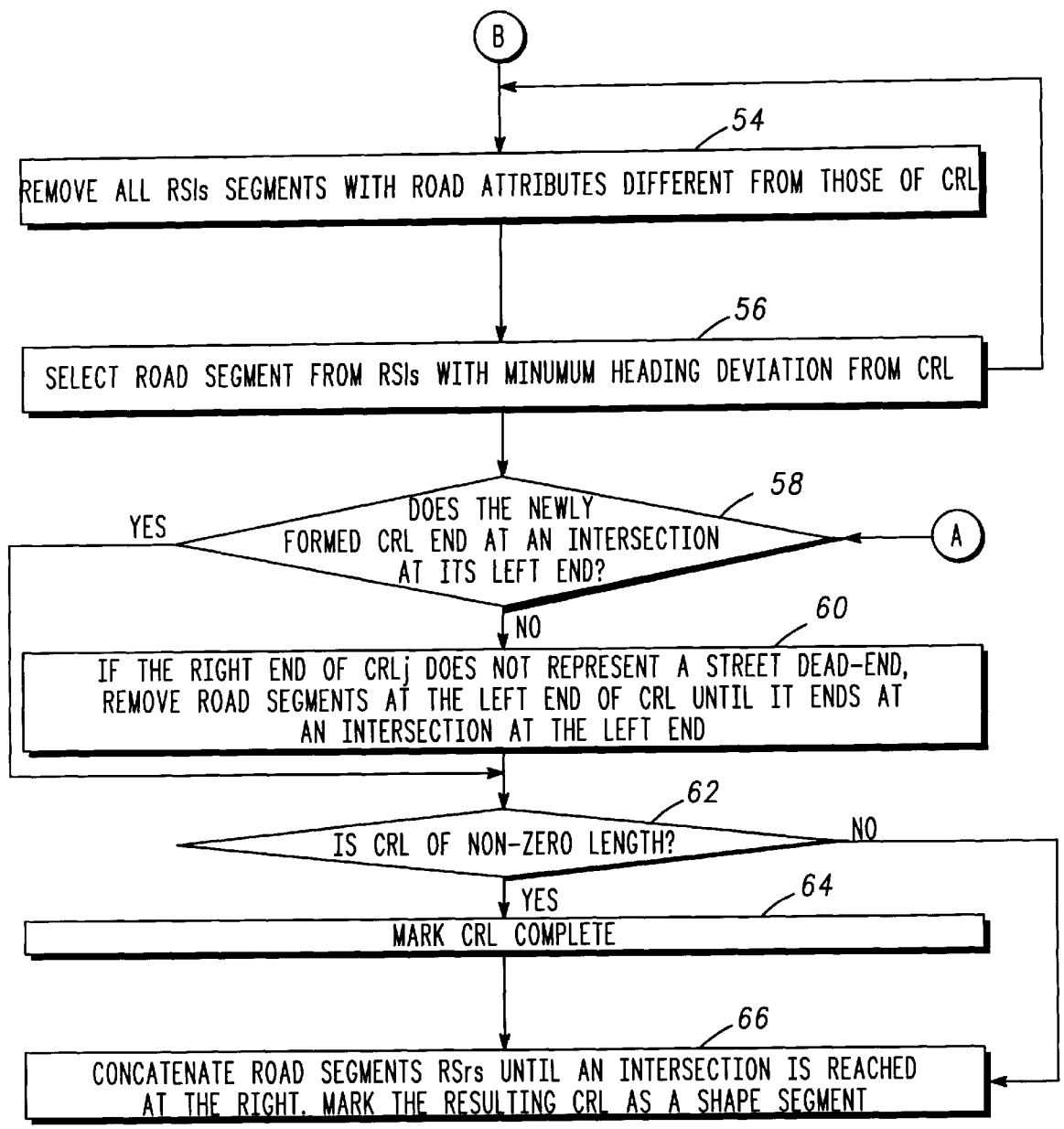

FIG. 2 illustrates the detailed process of Step 14 in FIG. 1; it is a preferred method of forming composite road lines from candidate road segments, RS.

Step 30 starts with road segment RS by assigning it to the right part of CRL in order to start building the right side of the composite road line, CRL. The attributes of RS also will become the attributes of CRL. Step 32 identifies clusters of road segments, RSrs, connected to the right end of CRL. Step 34 determines if the road heading deviation of any of the RSrs from that of CRL is less than the current value of DF.

If the answer to Step 34 is yes, Step 36 asks whether the tolerated RSrs, those whose headings are within FD from that of CRL, have the same road attributes as CRL. If the answer to Step 36 is yes, Step 38 removes from the tolerated RSrs any that have different road attributes from those of CRL.

Step 40 selects from the remaining the RSr segment with the least road heading deviation from that of CRL and attaches that segment to the right of CRL. The CRL road heading is considered to be equal to the road heading of the last, selected segment This process then loops back to Step 32 until the answer to Step 34 or Step 36 is no.

If the answer to one of Steps 34 and 36 is no, Step 42 assigns road segment RS to the left part of CRL in order to start building the left side. Step 44 then determines if the right end of the newly formed composite road line, from Steps 32–40, ends at an intersection. If Step 44 returns no, Step 46 removes the last road segment from the right end of CRL until it ends at an intersection unless it was representing a connection to a street dead-end from the last intersection of that street. This is necessary in order to remove potential shaped segment portions at the end of the composite road line.

After Step 46 or if Step 44 returns yes, Step 48 selects segment cluster, RS1s, connected to the left end of CRL. This process proceeds similarly to Steps 32 to 40, except that it extends CRL to the left.

Step 50 determines if the road heading deviation of any of the RS1s from that of CRL is less than the current value of DF. If Step 50 returns yes, Step 52 determines if any of the tolerated RS1s segments have the same road attributes as CRL. If Step 52 returns yes, Step 54 removes from the tolerated RS1s any that have different road attributes from those of CRL. Step 56 selects, from the remaining segments, the RS with the minimum road heading difference from that of CRL and attaches that segment to the left end of CRL.

The process continues by looping back to Step 48 until the answer from Step 50 or Step 52 is no.

Step 58 determines if the left end of the newly formed composite road line, CRL, ends at an intersection. This is necessary in order to remove potential shape segment portions at the end of the composite road line.

If Step 58 returns no, Step 60 removes road segments from the left end of CRL until it ends at an intersection unless it was representing a connection to a street dead-end from the last intersection of that street. After Step 60 or if step 58 returns yes, step 62 determines if CRL has a non-zero length. If Step 62 returns yes, Step 64 marks the CRL as completed. If Step 62 returns no, Step 66 concatenates road segments connected to the right end of CRL until an intersection is reached and marks the resulting composite road line as shape-segment road line.

Figure 3:
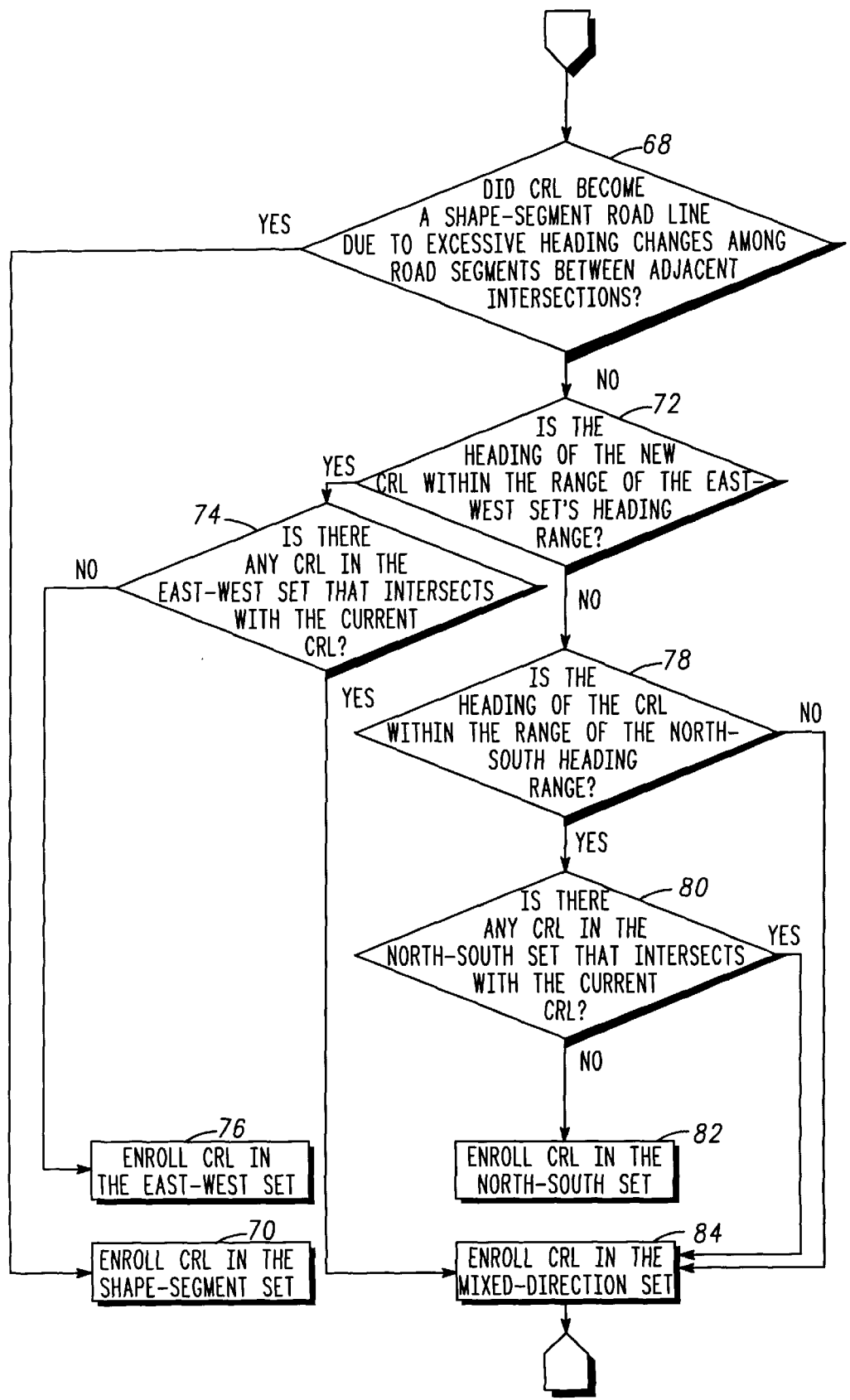
FIG. 3 is a flowchart of one of the steps of FIG. 1.

FIG. 3 illustrates the details of Step 16 in FIG. 1, a preferred method for classifying each composite road line, CRL, into one of four sets.

Step 68 determines if a given CRL was marked as a shape-segment road line due to excessive heading changes among elementary road segments between two adjacent intersections. In other words, Step 68 checks if CRL was marked as a shape-segment road line in Step 66 of FIG. 2. If Step 68 returns yes, Step 70 inserts CRL into the shape-segment set. If Step 68 returns no, Step 72 determines if the heading of the CRL is within the heading range of the East-West set.

If Step 72 returns yes, Step 74 determines if there are any composite road lines already in the East-West set that intersect with the CRL. If Step 74 returns no, Step 76 classifies the CRL in the East-West set. If step 72 returns no, Step 78 determines if the heading of the new CRL is within the heading range of the North-South set. If Step 78 returns yes, Step 80 determines if there are composite road lines in the North-South set that intersect the CRL.

If step 80 returns no, Step 82 inserts the CRL into the North-South set. If Step 74 returns yes, or Step 78 returns no, or Step 80 returns yes, Step 84 inserts the CRL in the mixed-direction set.

As those skilled in the art will appreciate, the classification of the composite road lines into non-intersecting sets of road lines could be further optimized after this initial classification process is completed. The largest size set could be enlarged by acquiring road lines from the others under the criterion of no intersection within the set itself. As a consequence, the sets could contain a mixture of composite road lines that belong to a different initial classification. After all, the only important criterion for creating the composite road line sets is maximum separability of non-intersecting composite road lines in order to minimize the number of iterations needed in the decompression algorithm for matching pairs of potentially intersecting composite road lines (see FIG. 10A).

The method of FIGS. 1–3 can better be understood with reference to an example spanning FIGS. 4–8.

Figure 4:
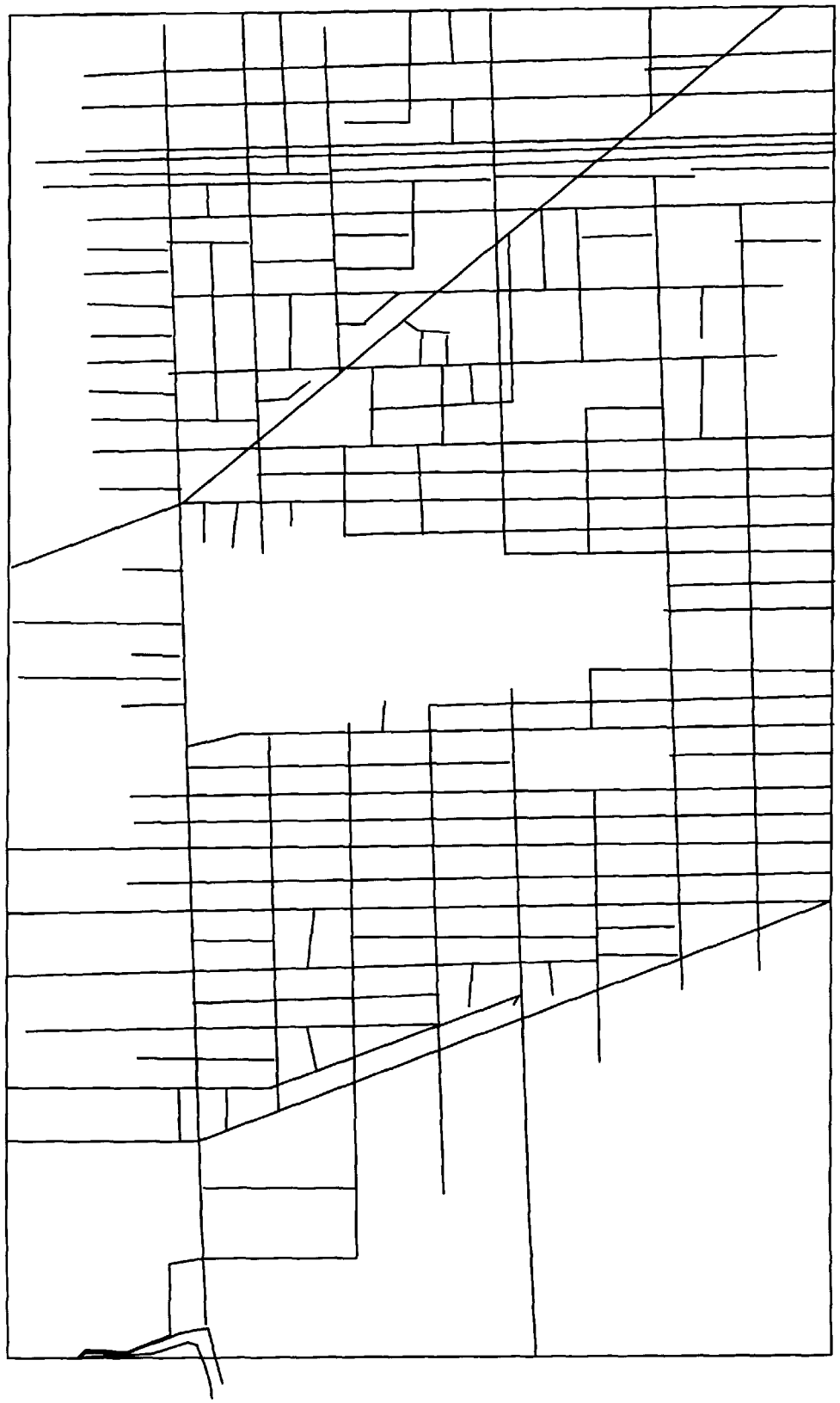
FIG. 4 is a diagram of an exemplary road map in accordance with the present invention.

FIG. 4 illustrates a parcel of a road-map network to be compressed by the method described above. FIGS. 5–8 illustrate the resulting four sets of composite road lines, which are the compressed road-map data to be used by the decompression process of FIG. 1 to compute the intersections and thus, reconstruct the original uncompressed road-map database within an acceptable accuracy.

Figure 5:
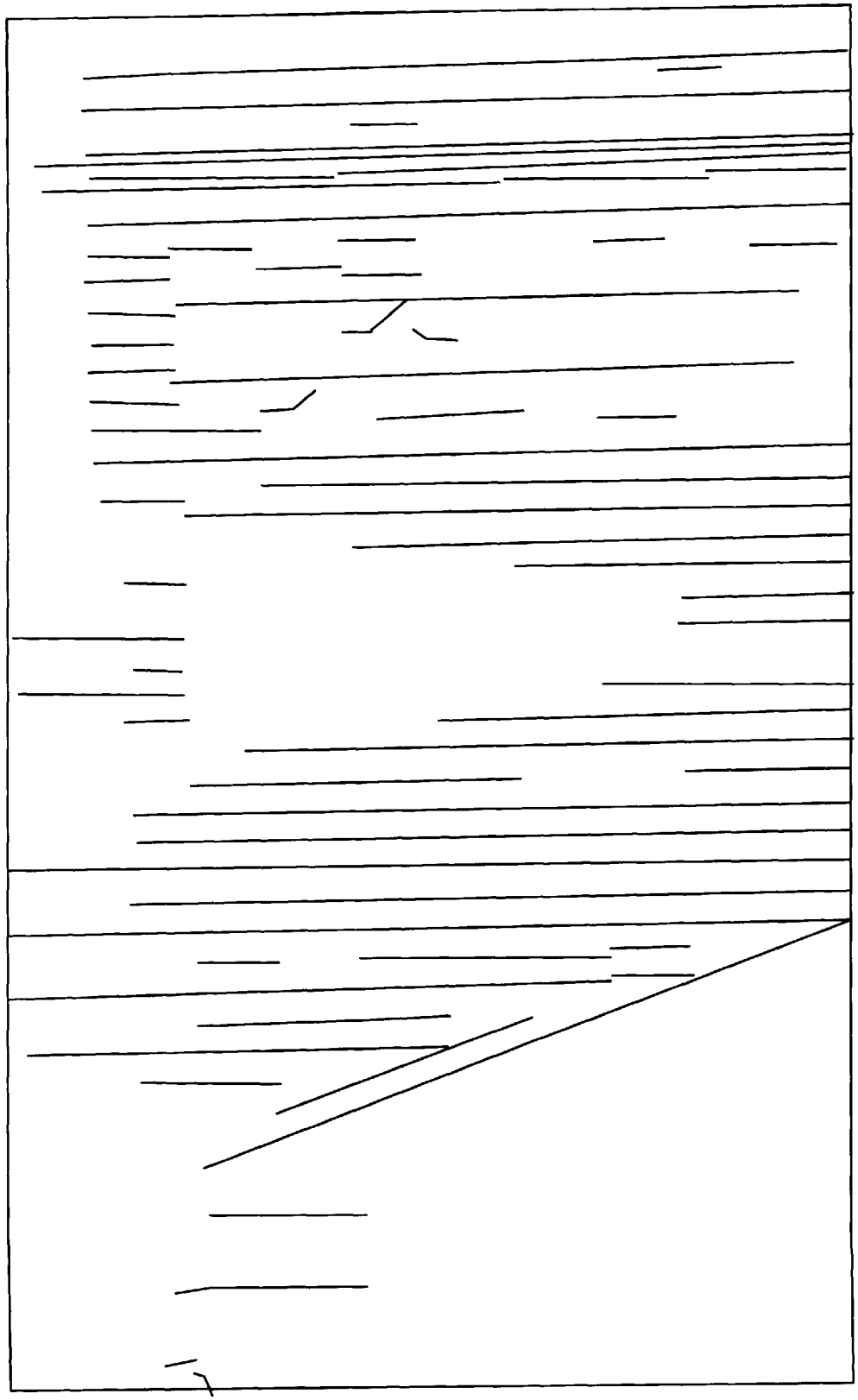
FIG. 5 is a diagram of a portion of FIG. 4.

FIG. 5 shows the East-West set of composite road lines having no intersections among them.

Figure 6:
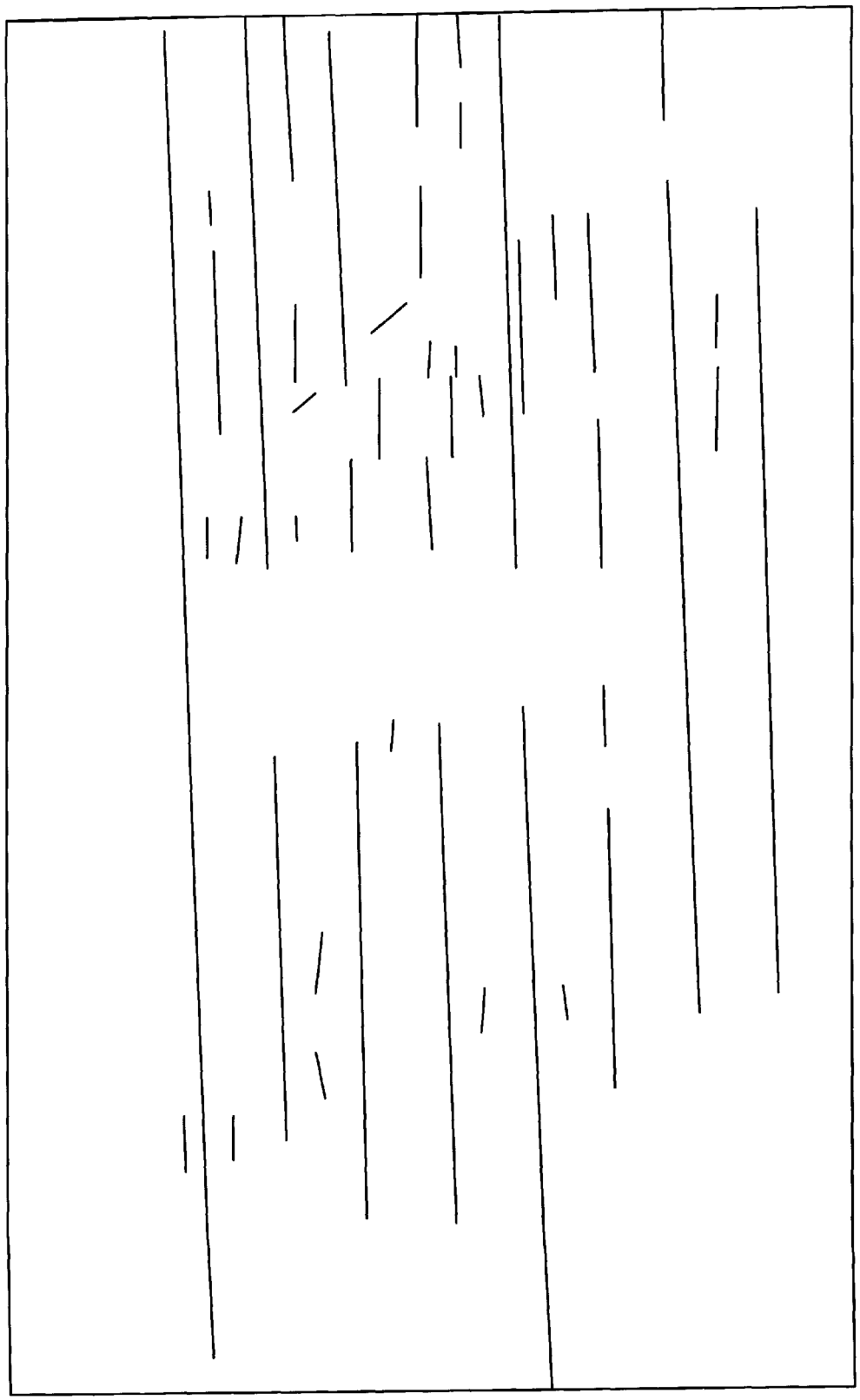
FIG. 6 is a diagram of a portion of FIG. 4.

FIG. 6 shows the set of composite road lines oriented in the North-South direction with no intersections among them.

Figure 7:
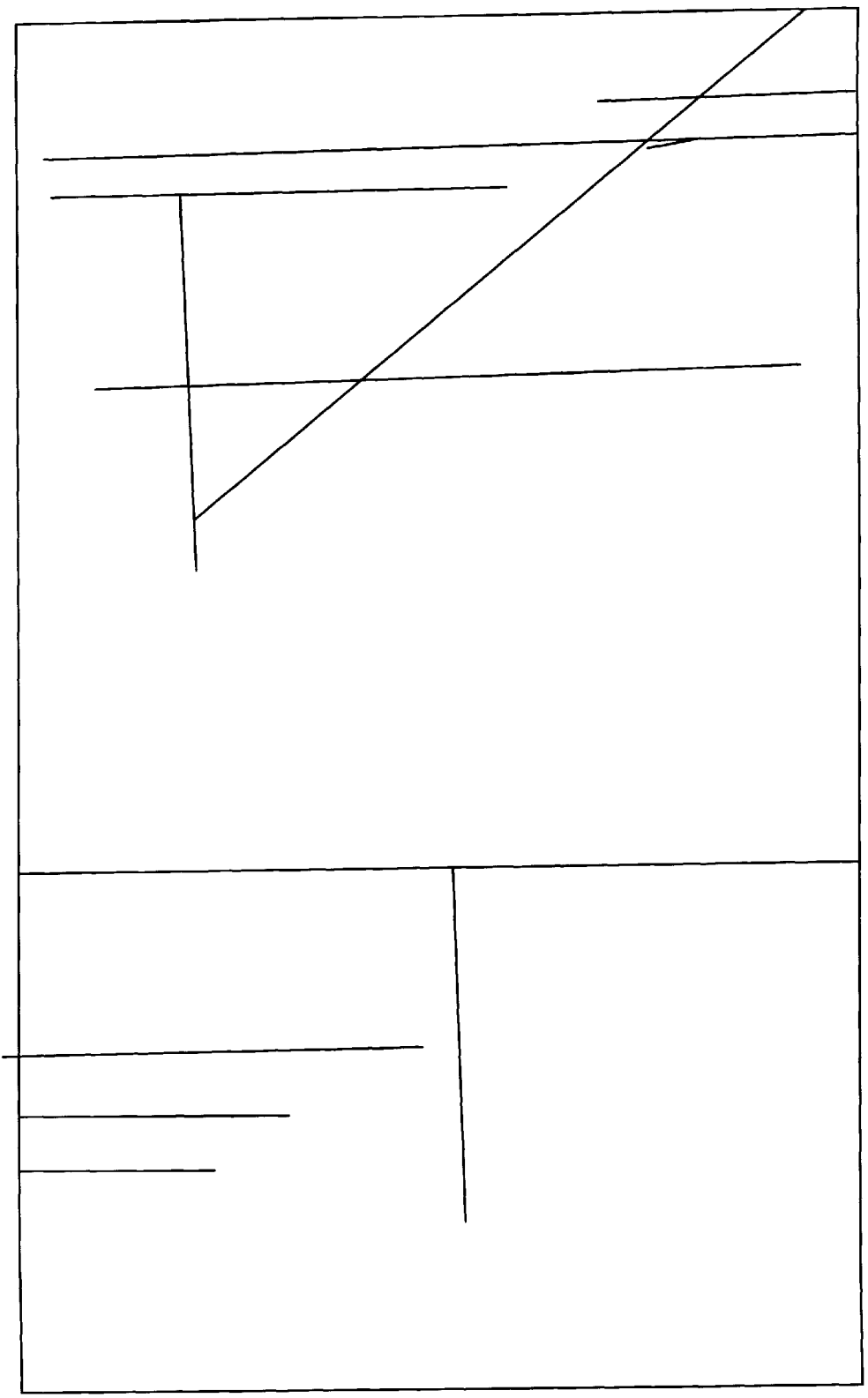
FIG. 7 is a diagram of another portion of FIG. 4.

FIG. 7 shows the set of composite road-lines that could not be placed in any of the two previous sets because they would intersect with at least one of the composite road lines in both of these sets.

This set of composite road lines is preferably called the mixed-direction set.

Figure 8:
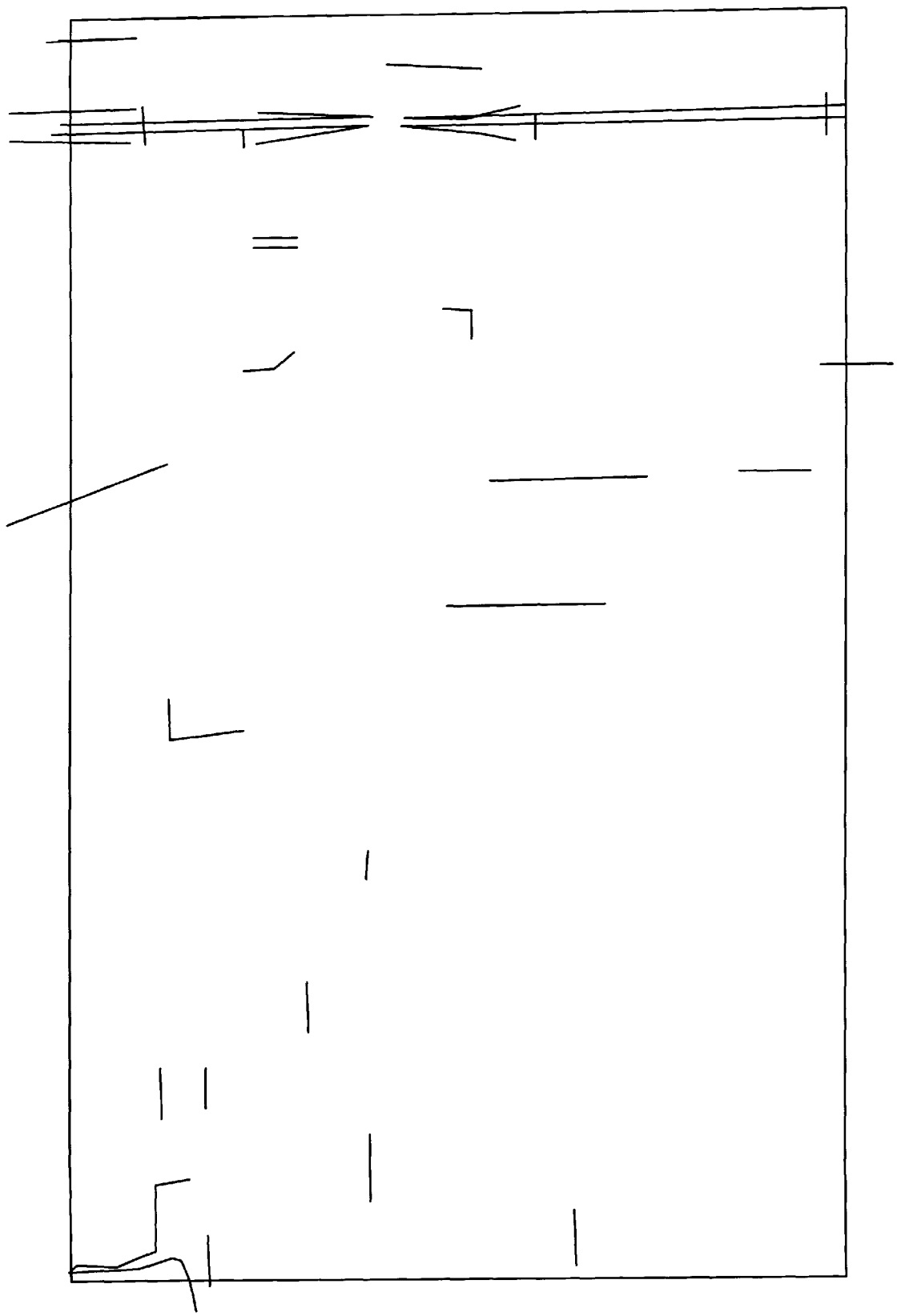
FIG. 8 is a diagram of still another portion of FIG. 4.

FIG. 8 shows the set of the so-called shape-segment road lines. The shape-segment road lines have significant road heading changes among the elementary road segments from which they are composed. Consequently, they, unlike the other three sets, cannot be approximated by straight-line composite segments. Also, shape-segment road lines are designed to span two adjacent intersections; that is, they have no intersections within themselves.

Overlaying the four sets of composite road lines, shown in FIGS. 5–8, yields a good approximation of the original road network in FIG. 4. Preferably, the composite road-lines are represented as straight-lines if the heading variance of their component elementary road segments does not mask information critical to the particular road-map data processing application being used.

The threshold of discarding the heading variance is tuned by incremental compression. First, the compression synthesis starts with a minimum degree of freedom of road-heading change to qualify a road segment for inclusion in a composite road line. Then, more and more variance is tolerated. After each step, the decompression is attempted before a more aggressive straight-line composition is performed (Steps 12–26). If the decompressed topology exhibits a loss of significant information, the iterative compression process stops and it reverts back to the previous degree of freedom value where the information loss was tolerable.

Figure 9:
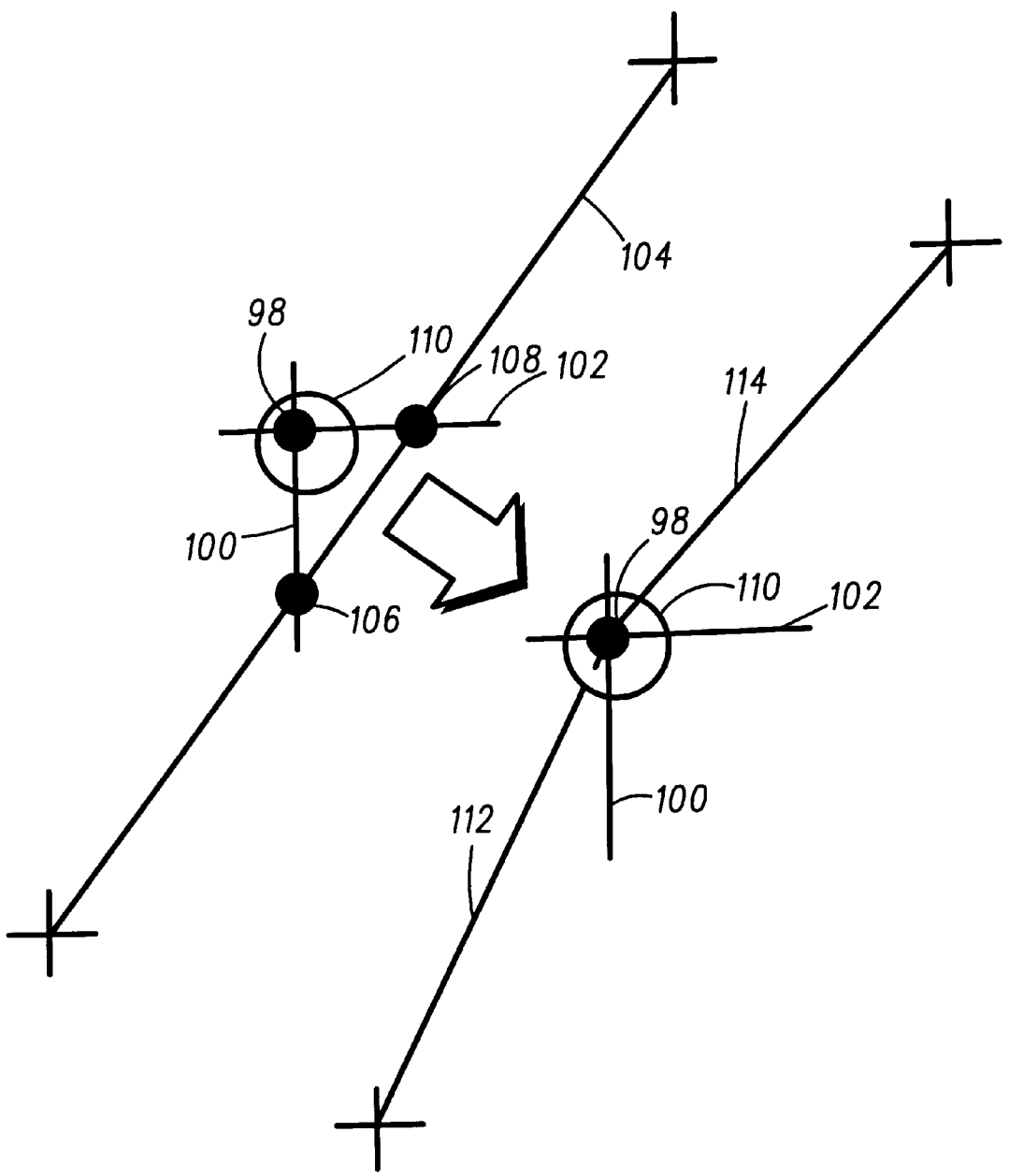
FIG. 9 is an illustration of a calculation of an intersection of several road segments in accordance with the present invention.

One example of a loss of significant information at decompression is incorrect intersection derivation, specifically, the production of three intersections, when only a single one is present in the original map. Such a scenario is illustrated in FIG. 9, where, due to substantial heading variance in the component road segments of the three composite road lines, 100, 102, and 104, the original single intersection 98 will give rise to three intersections, 98, 106, and 108, after decompression. Step 24 will return a no in this case.

Figure 10A:
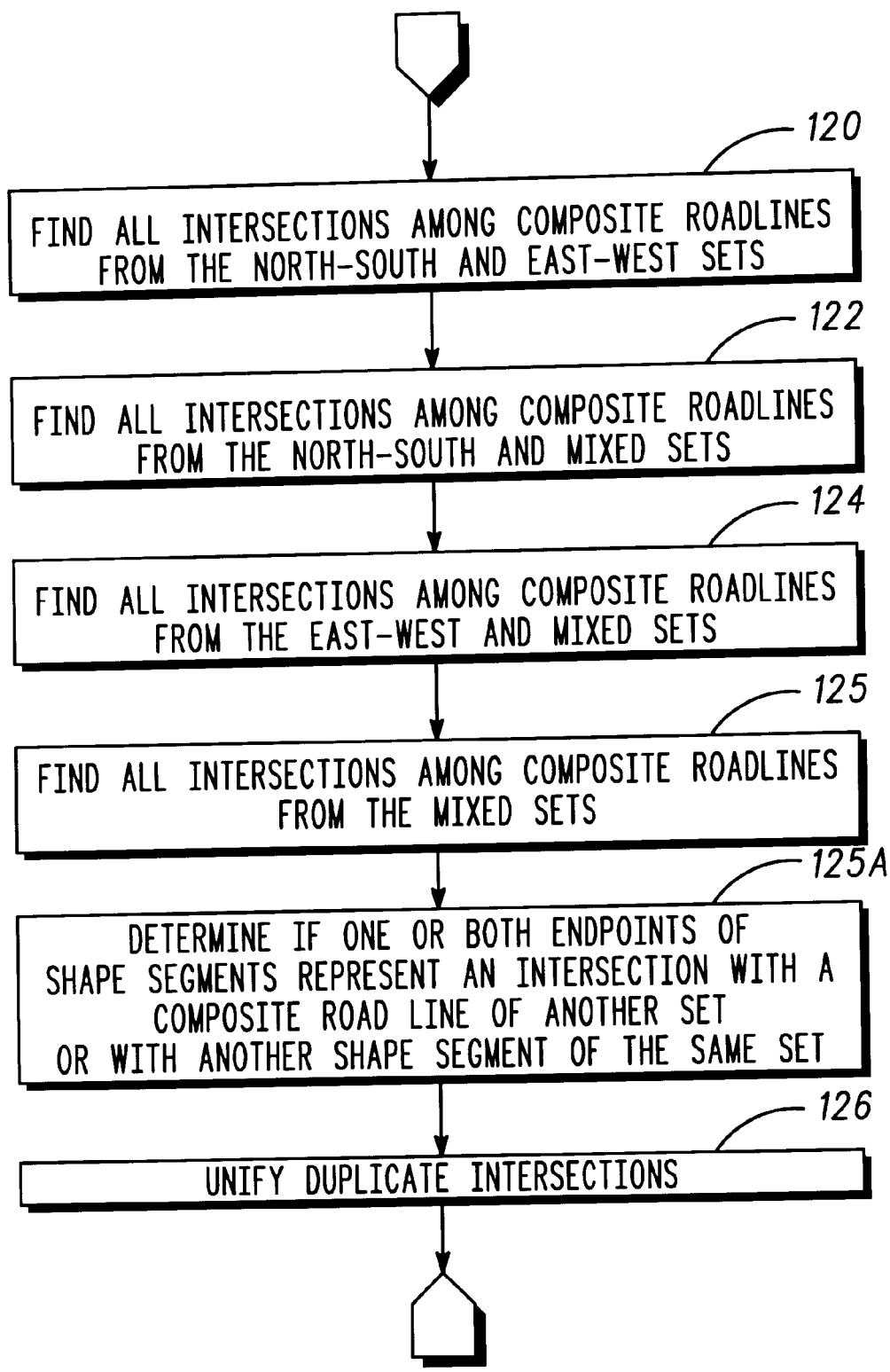
FIG. 10A is a flowchart of an alternate method in accordance with the present invention.

The decompression method of FIG. 10A uses the circle of intersection unification 110 around the original intersection 98 to signify the error tolerance. All intersections falling inside the circle 110 are considered as a single intersection. Since the two intersections 106 and 108 with the diagonal composite line 104 do not fall within the circle 110, the decompression method comes to an erroneous conclusion of having three different intersections.

FIG. 9 also shows the approach for correcting the situation of erroneous intersections in the above scenario. When the iterative compression method in FIG. 1 reverts back to the previous, smaller degree of freedom value, the heading change in the diagonal composite line 104 at this intersection is not tolerated and the diagonal composite line 104 is effectively broken into two separate composite lines 112 and 114. As a consequence, the decompression method will compute intersections that fall within the unification circle 98 and will take them as a single unique intersection consistent with the original map.

Figure 11:
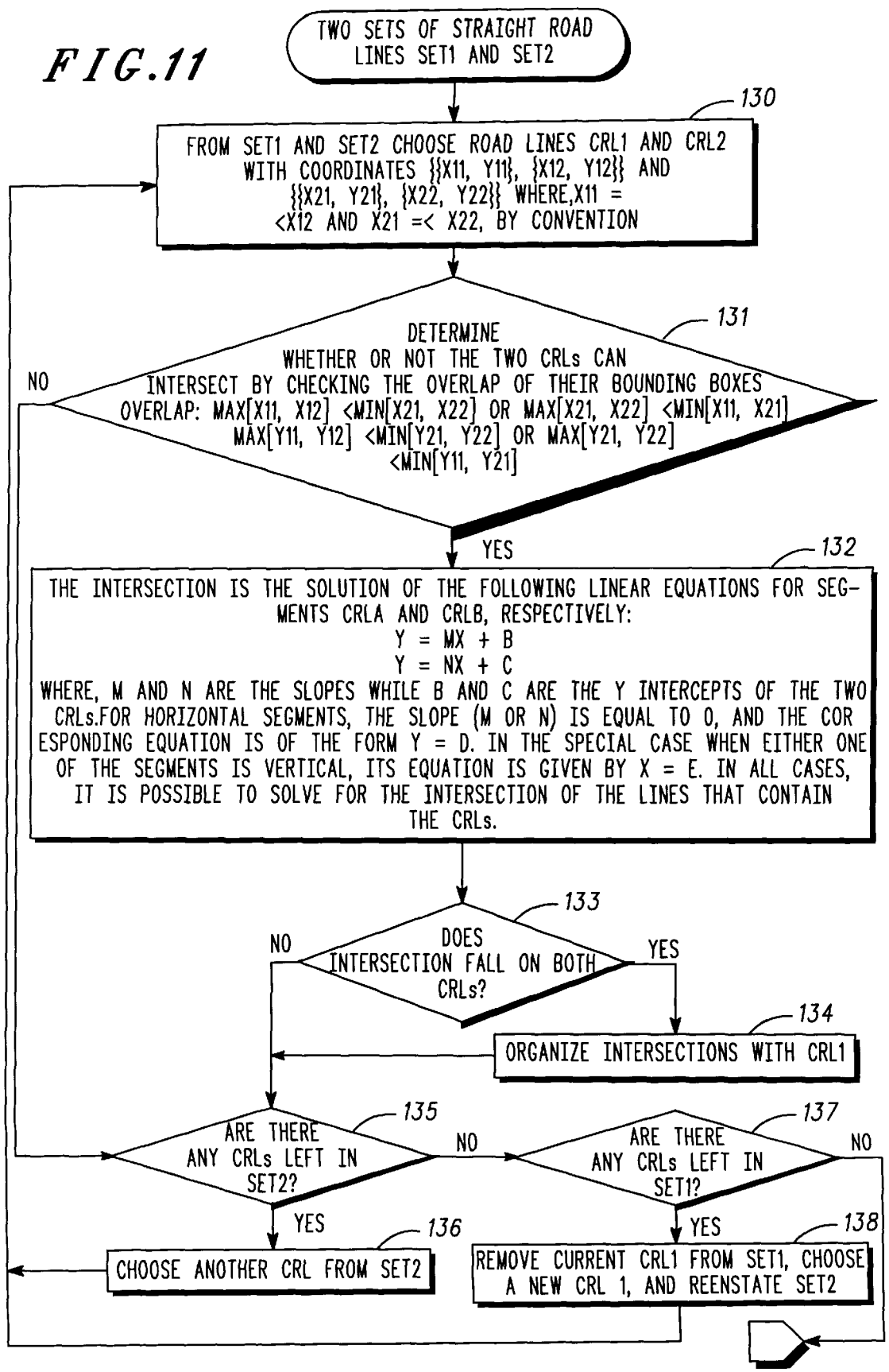
FIG. 11 is a flowchart of a method for implementing the method of FIG. 10A.

Step 22 runs the decompression method of FIG. 11 in a special compression verification mode. When Step 126-3 below is performed in this compression verification mode, the intersection results are checked against the original uncompressed map data. If multiple intersections fall within unification circles centered around actual intersections, the compression is considered valid; if it fails, the action in FIG. 9 takes place to correct the situation.

A preferred decompression method is illustrated in the flowcharts of FIGS. 10A, 10B, 10C, and 11. All nodes can be recovered by calculating the intersections among road lines of paired sets. In FIG. 10A, Step 120 finds all intersections between all the composite road lines of the North-South and East-West sets. Step 122 finds all intersections between all the composite road lines of the North-South and mixed sets. Step 124 finds all intersections between all the composite road lines of the East-West and mixed sets. Step 125 finds all intersections among all the composite road lines of the mixed set. No other combinations of sets need to be considered, since, by construction, the self intersections of the North-South and East-West sets will yield none. Step 125a determines if one or both endpoints of the shape segments represent an intersection with a composite road line of another set. For this purpose, the distance between each shape segment endpoint and each composite road line is computed. If such a computed distance is shorter than the unification circle radius, the shape segment endpoint is considered to be anchored on the composite road line thus forming an intersection. Step 126 unifies all duplicate intersections, within unification circles, into unique intersections, as explained in detail below with reference to FIGS. 10B and 10C.

Figure 10B:
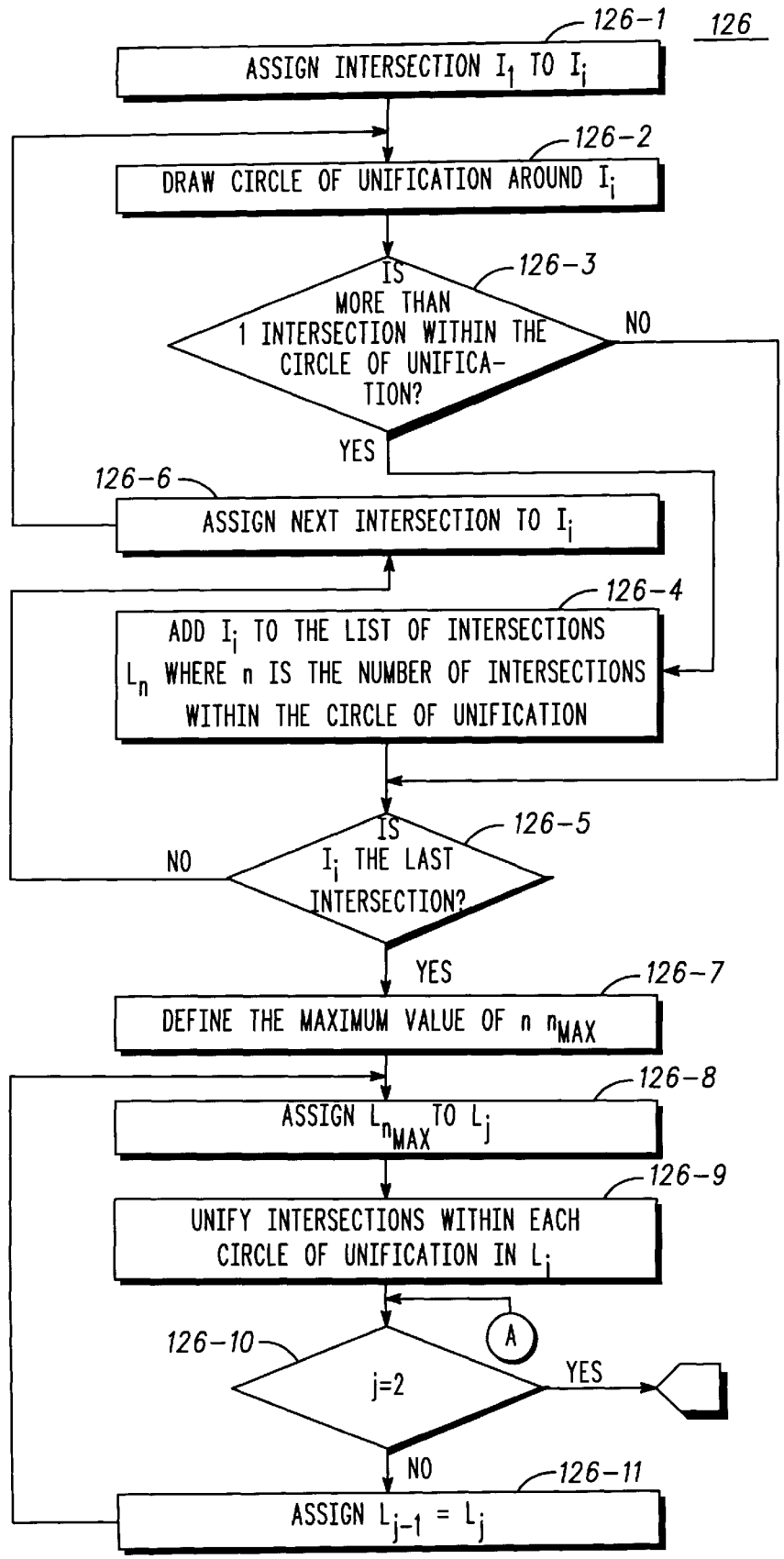
FIG. 10B is another flowchart of a method for implementing the method of FIG. 10A.

Step 126 is shown in detail in FIG. 10B. Here, Step 126-1 assigns the first intersection, I1, to Ii. Step 126-2 then draws a circle of unification 110 around Ii. Step 126-3 then determines if there is more than one intersection within the circle 110. If Step 126-3 returns yes, Step 126-4 adds Ii to the list of intersections Ln, where n is the number of intersections within the circle 110. After Step 126-4 or if Step 126-3 returns no, Step 126-5 determines if Ii is the last intersection. If Step 126-5 returns no, Step 126-6 assigns the next intersection to Ii and loops back to Step 126-2. If Step 126-5 returns yes, Step 126-7 defines the maximum value of n and Step 126-8 assigns Lnmax to Lj because the unification of the intersections will start with the circles containing the maximum number of intersections to be unified. Step 126-9 then unifies the intersections within each circle of unification 110 in Lj (this is described in detail below) Step 126-10 then determines if j=2 and, if it is, the routine ends because the unification circles in the last list contained only two intersections to unify and step 126-3 filtered out the unification circles with only one intersection from the linklist of the unification circles. If step 126-10 returns no, Step 126-11 assigns Lj−1 to Lj and loops back to step 126-8.

Figure 10C:
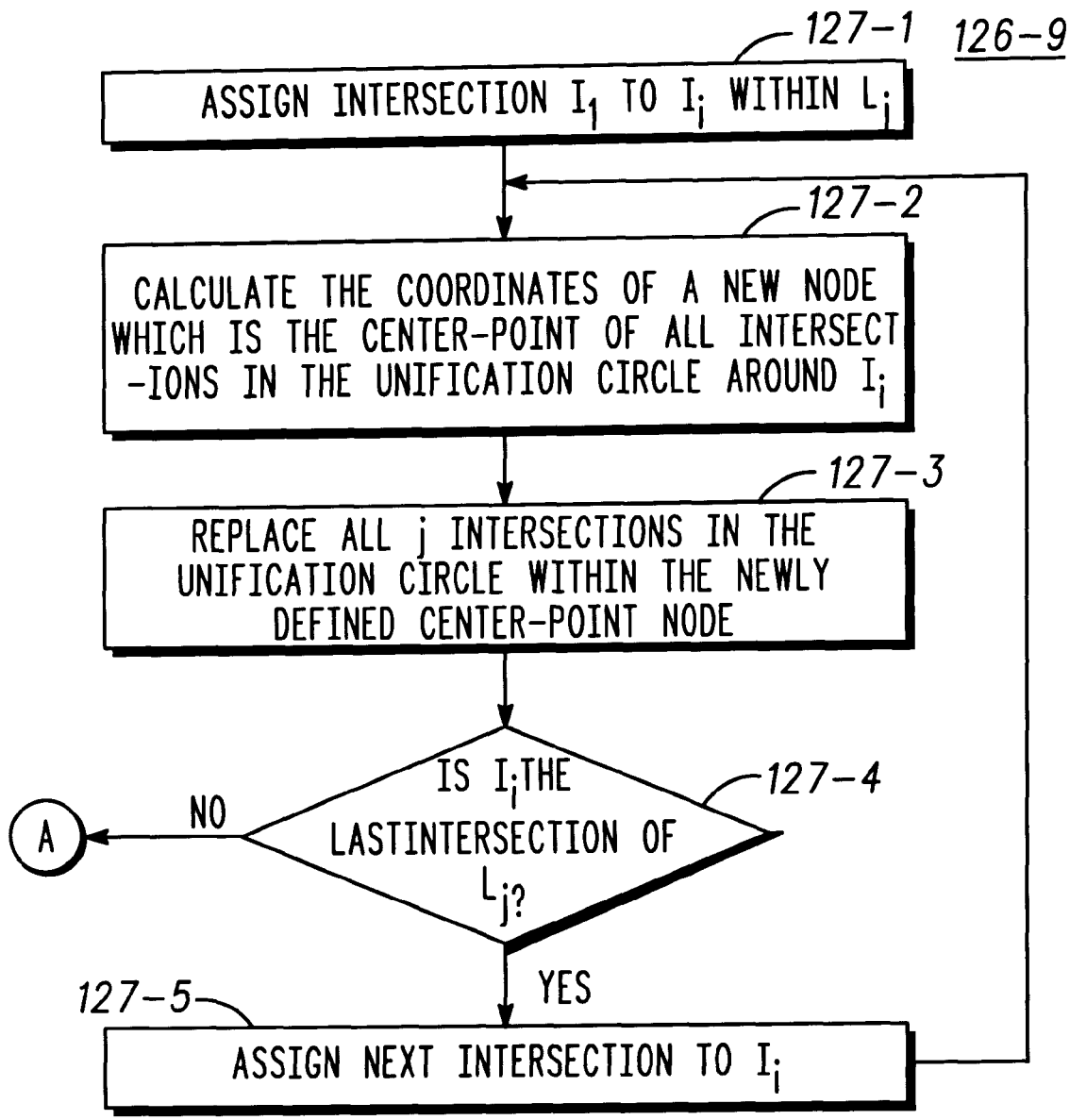
FIG. 10C is a flowchart of a method for implementing the method of FIG. 10B.

FIG. 10C presents the details of Step 126-9 of FIG. 10B.

Step 127-1 assigns the first intersection, I1, to Ii within Lj. Step 127-2 calculates the coordinates of a new node which is the center point of all the intersections in the circle 110 around Ii. Step 127-3 replaces all j intersections in the circle 110 with the newly defined center point node. Step 127-4 determines if Ii is the last intersection of Lj and if yes the routine ends. If step 127-4 is no, step 127-5 assigns the next intersection to Ii and loops back to step 127-2.

A preferred method for use in steps 120–124 for reconstructing the intersections of two sets of composite road lines is illustrated in FIG. 11. Step 130 takes a composite road line segment from each of two sets, A and B. These two CRLs, CRLA and CRLB, are defined geometrically by their end points, {{x11,y11}, {x12,y12}} and {{x21,y21}, {x22,y22}}, respectively. Arbitrarily, a convention is assumed here whereby x11=<x12 and x21=<x22 for the purpose of complying with a Cartesian coordinate system Before proceeding, a determination, in Step 131, of whether the CRLs are likely to intersect is made. Being of finite extent, this determination is made by showing if their bounding boxes overlap. With regard to a finite segment, a bounding box is defined to be the smallest rectangle that fully contains the segment. Simply, it is the rectangle, two vertices of which are the end points of the segment. Step 131 determines overlap by checking up to four inequalities disjunctively, as shown.

If any one of the inequalities is true, there is no overlap, the two CRLs cannot possibly intersect, and Step 131 returns no. The consequent action is to proceed to Step 135, which checks if there are any CRLs left to choose from in Set 2. If Step 135 returns yes a new CRL is chosen from Set 2, the process loops back to Step 130, and repeats.

If all the inequalities in Step 131 fail, the bounding boxes do overlap, and there is a chance that the two segments might intersect. In this case Step 131 returns yes and the process proceeds to Step 132. Here, using methods from Linear Algebra, an intersection is computed for two lines that coincide with the two CRLs at hand.

Step 133 determines if the intersection falls on both CRLs involved. If it returns no, there is no real intersection, and nothing is done. If it returns yes, the intersection is sent to Step 134, where it is organized in a list associated with the current CRL1.

When all CRLs of Set 2 have been exhaustively paired with the current CRL1, Step 135 returns no, which prompts Step 137 to check if any CRLs remain in Set 1. If Set 1 still contains CRLs, the current one is discarded and a new one takes its place. At this point, Set 2 is reinstated to its original state, and the process repeats with the new CRL1.

When there are no CRLs left in Set 1, Step 137 returns no, all intersection have been found, and the process terminates.

In Step 28 of FIG. 1, the last compressed map is discarded and the previous one is used that was compressed with a lesser degree of freedom, DF. Doing this assures the required quality of the entire map but it may not be optimal. As those skilled in the art will appreciate, for each particular compression application, different optimality criteria may apply. For some applications the size of the compressed database might be of utmost importance, whereas the decompression time, the size, and the complexity of the decompression program might be of little concern. For other applications, trading off more CPU cycles or decompression program complexity for an even higher compression ratio might not be an option.

Depending on the particular optimality criteria employed, Step 28 in FIG. 1 could produce significantly different compression performance. That is, Step 28 need not be so strict as to discard the entirety of a highly compressed map on the basis of some local discrepancies, such as the occasional creation of multiple intersections upon decompression, when in reality there is only one. For example, a higher degree of freedom, DF, may be employed to achieve better compression performance, if the process could also apply techniques to eliminate offending side effects of the subsequent decompression.

A case in point is the corrective action demonstrated in FIG. 9, where the single composite road line, 104, is intentionally broken into two road lines, 112 and 114. These two road lines could be represented as separate composite road lines with end points that include the common intersection 98. It is also possible to combine these two road lines into a polyline which would be represented as a sequence of three points, the common point being stored only once. The storage savings would be even more significant if the polyline were to include three or more straight composite road lines. Augmented only slightly, the decompression process could be made to accommodate polylines. Simply, it would compute intersections between two polylines by applying the intersection computation process to individual composite road line segments comprising the two polylines.

Figure 12:
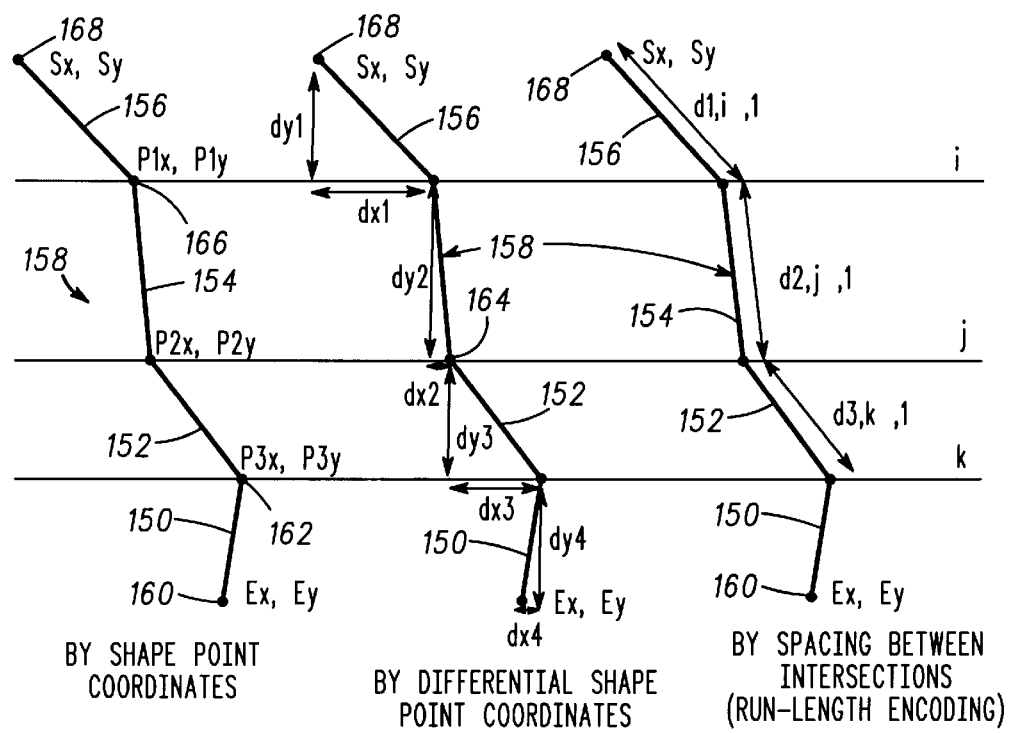
FIG. 12 is an illustration of three different ways of representing a composite road line in accordance with the present invention.

FIG. 12 shows three alternative ways for efficiently compressing contiguous composite road lines 150, 152, 154, and 156 by representing them collectively as a polyline. While retaining their individual variable headings, the component road lines can collectively represent the single road line, 158, in the form of a polyline defined by the sequence of points, (158, 160, 162, 164, 166, and 168). Consequently, the individual composite road lines need not be defined by their own end points; this would mean wasteful duplication of intermediate or shape points, 162, 164, and 166. As mentioned above, composite polylines would enhance overall compression performance over an approach limited to straight composite road lines, and decompression could be accommodated with a minor variation to the process presented in FIG. 11.

Using polylines or zig-zag lines, higher compression ratios may be achieved by:
  specifying the shape point coordinates, as explained above, or
  differentially encoding the shape point coordinates by specifying the vector changes, (dx,dy) starting from the initial point of the polyline, or
  run length encoding by specifying a distance from the first end point to the first shape point, followed by distances between consecutive shape points.
If the shape points are known to lie on certain road lines, their coordinates may be found by computing the intersection of appropriate arcs. If the road lines intersecting two consecutive shape points happen to be nearly parallel separated by a known distance, the location of the shape points may be computed via the Pythagorean theorem.

These alternatives will improve compression performance, over that of the straight composite road line alternative, at the expense of more computation for decompression.

Figure 13:
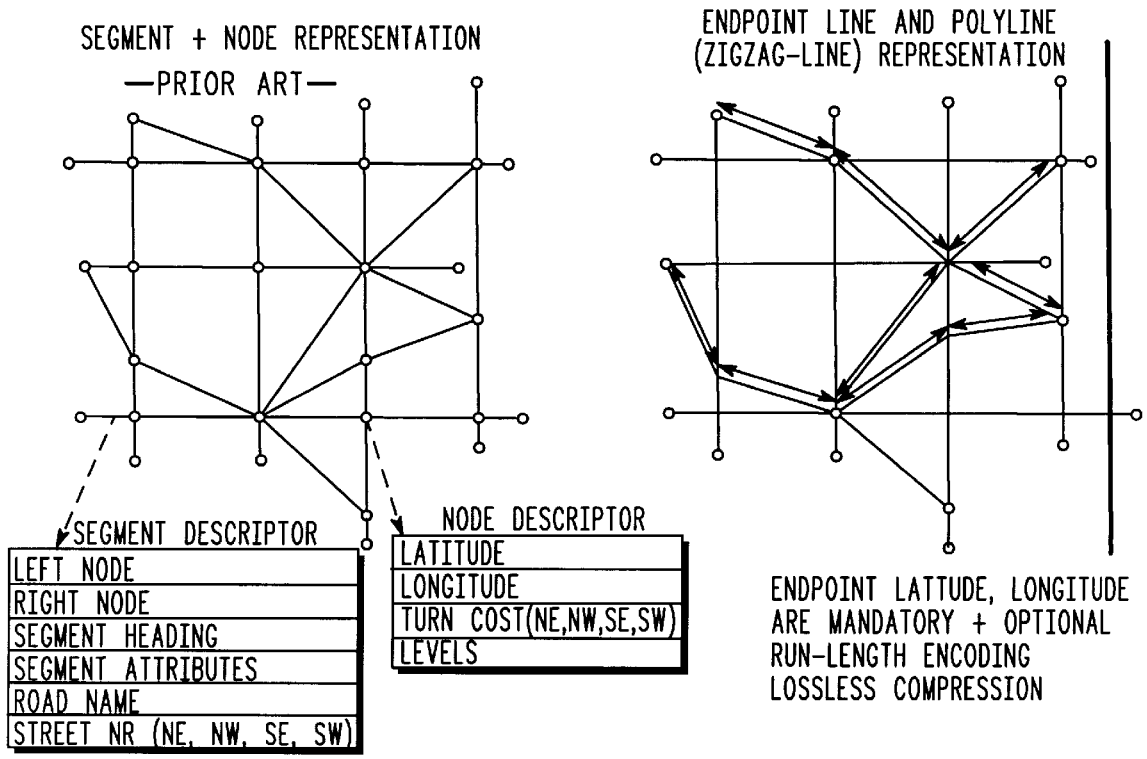
FIG. 13 is an illustration of alternate representations of a road map in accordance with the present invention.

FIG. 13 illustrates the combined use of straight composite road lines with lossless run-length encoding for the rest of the composite road lines. If spacing is defined for a composite road line as the distance values between its adjacent intersections, the corresponding shape points are reconstructed by locating and defining the intersection points. If no spacing values are defined for a composite road line, a straight line between the two end points is assumed. The intersections between the straight composite road lines and the zig-zag composite road lines can be easily reconstructed by using
  the fully defined straight line,
  the closest known intersection (initially, an end-point) of the zig-zag line, and
  the distance value (spacing) between the closest known intersection (end-point) and the unknown intersection point.

As those skilled in the art will appreciate, if the out-of-tolerance road lines are replaced by composite road lines with accurate heading changes, the composite road lines produced by the method of FIG. 1 will not have to terminate when the first road line degree of freedom, DF, value is too large. Instead, the process will continue as long as the compressed storage requirement continues to decrease from one iteration to the next. When the storage stops decreasing substantially or increases, the process will terminate. Alternatively, the process may terminate when the DF value reaches a predetermined maximum, which might not be tolerated by a particular application program, perhaps because the heading information was substantially corrupted to cause the application to malfunction.

Regardless of the criteria used to retain or to discard the original road heading changes in the composite road lines, the decompression time can also be reduced by adding the number of intersections expected for a road line to the end of its data structure. This may significantly reduce the number of iterations of the method shown in FIG. 11 for reproducing the intersections. If the number of intersections reaches the specified count and these intersections are sufficiently far apart to be different from duplicate intersections, then all further iterations for locating additional intersecting lines can be saved.

For those skilled in the art, it would be a routine design modification to apply hashing and specialized sorting techniques to reduce the computational load for intersecting two sets of road lines. For each composite road line, CRL in Set 1, such an approach would identify a subset of road lines in Set 2 with which intersections are possible. Limiting the intersection computation to this subset of Set 2 will reduce execution time and thus the decompression time. As those skilled in the art will appreciate the bounding-box criterion in FIG. 11 is just one such technique.

1.1 Evaluating the Resulting Compression Ratio

Table 1 shows the storage requirements for a typical Chicago-area road-map parcel before and after composite road line compression. The uncompressed data is represented in segment/node data structures, while the compressed data in represented is composite line/end-point data structures. The compression numbers shown in Table 1 reflect the results obtained by invoking an implementation of the compression method described in FIG. 1. As shown, the compressed database, CDB, requires 2,041,174 bytes of storage compared to 14,089,712 bytes needed to store the original uncompressed database, UDB.

As this was the purpose of the compression method described in FIG. 1 the nodes were completely eliminated. In addition, the storage need for representing the segments was also significantly reduced because of combining most of them into a much smaller number of composite road lines. As a result, almost an order of magnitude of storage need reduction was achieved.

As we can see from Table 1, approximately half of the compressed storage need is used for representing the straight composite road lines that replaced their component segments. The other half of the storage was needed for representing the shape-points of curved lines. Consequently, significant further reduction can be achieved by using one or several of the following methods:
  Reduce the storage needed for representing the shape points of curved lines
  Reduce the overall number of composite road lines (CRLs) by combining more component segments into a fewer number of CRLs Reduce the storage requirements for representing a CRL As described with FIGS. 12 and 13, polylines or zig-zag lines can be employed to gain from the first two methods described above. Another method is described below, in section 2.0, to much more efficiently utilize both of the first two opportunities at the same time. Section 3.0 describes yet another method to gain from the third method.

2.0 Compression Improvements by Predetermined Shape-Types

The preceding description described how to reduce the number of road lines in an area by replacing a straight, connected sequence of road segment lines with a single, straight composite road line. The major obstacle to further reducing the number of road lines is the loss of precision when larger differences in the road-heading of adjacent road segments are ignored. Thus, the challenge is to replace all sequences of connected road segments with single lines even if the lines come in a variety of shapes and sizes. This can be accomplished with minimal additional cost in terms of compression complexity or computation time or memory requirements for defining the shape of the composite road lines. This additional cost of shape definitions should be significantly less than the gain resulting from the elimination of the cost of the representation of the end-point definitions of the additional straight composite road-lines.

The preferred approach for further reducing the number of composite road lines and for a more compact representation of curved lines is presented here. This method classifies shaped road lines into a number of predetermined shape categories. This is illustrated in FIGS. 14, 15, 16, and 17.

A map representation 198 based on an elementary straight line segment approximation approach is illustrated in FIG. 14. This linear approximation was also used in the above described, composite road line classification method for the set of shaped segments, an example of which is illustrated in FIG. 8. The uncompressed form of the map is made up of shaped road lines represented by piecewise-linear curves involving interconnected straight-line or elementary road segments. As a result, the number of road segments 200 and the number of nodes 202 connecting the road segments 200 is high since a whole sequence of segments 200 is needed to represent a line even if no intersection exists on that line. The full description of the linear approximation is repeated for each line even if several lines have an identical shape.

In contrast to FIG. 14, FIG. 15, illustrates a significant reduction in storage obtained by applying a shape classification compression approach. All road lines 204 between the intersections 206 are represented by a single line regardless of their shape and orientation. The number of road segment lines 204 and the number of nodes 206 connecting them are significantly reduced from those of FIG. 14.

Figure 16:
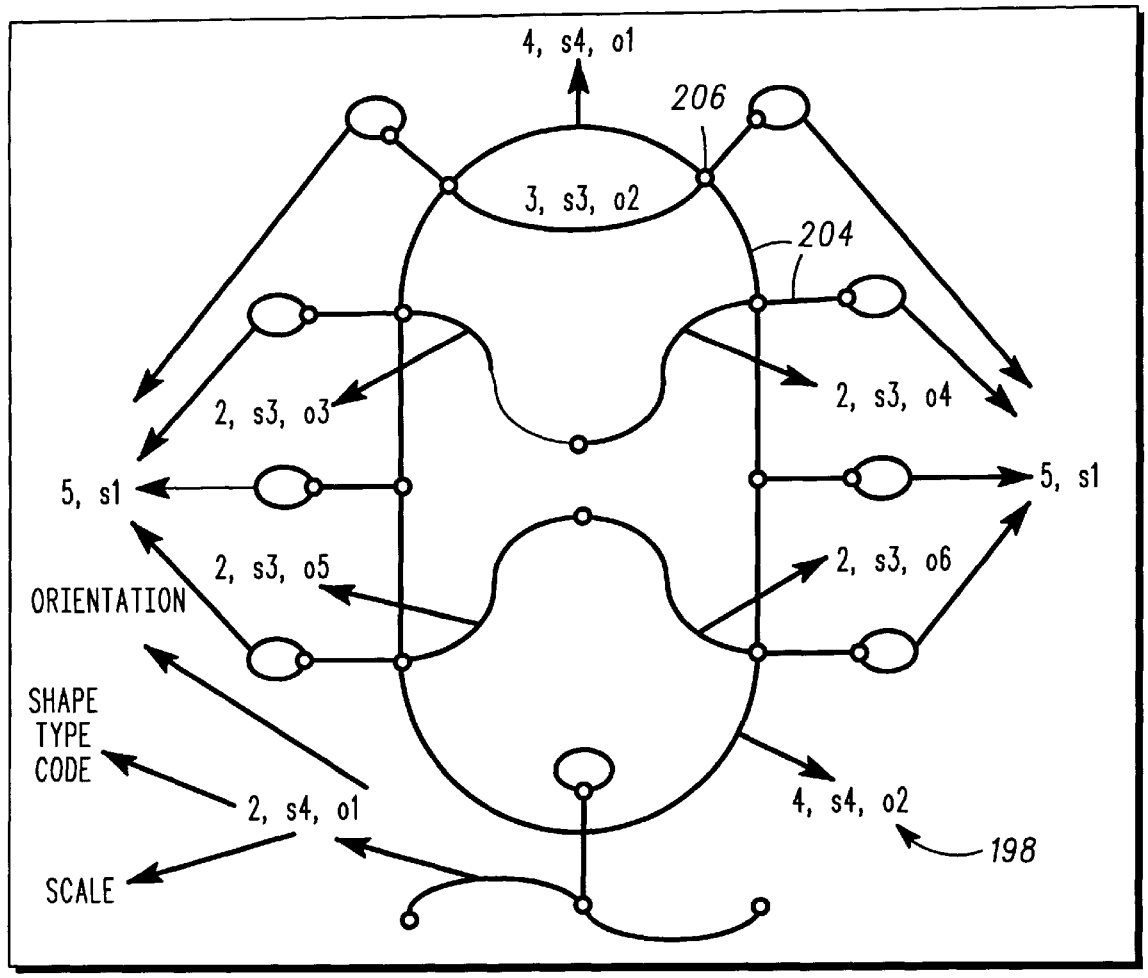
FIG. 16 is a diagram illustrating the fields representing each road segment in accordance with the present invention.
Figure 17:
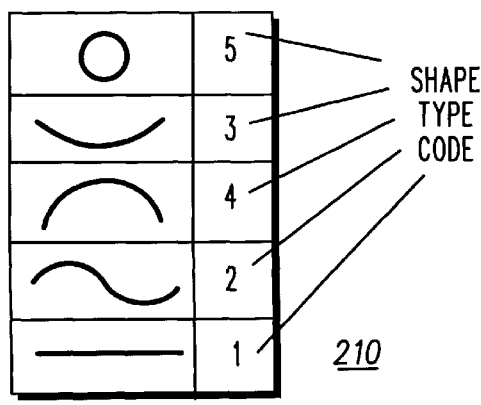
FIG. 17 is a exemplary table of shapes in accordance with an embodiment of the present invention.

FIG. 16 delineates the storage representation in the compressed image. Each shaped composite road line 204 is represented by one of its end-points and three attributes defining its shape, scale, and orientation, respectively. Road lines having identical shapes are marked by the same "shape type code" even if they are of different size and orientation. A Shape Type Directory 210, as shown in FIG. 17, is need to decompress SCRLs. Each entry in the directory corresponds to a unique shape class of appropriate precision and marked by a corresponding shape type code.

Figure 18:
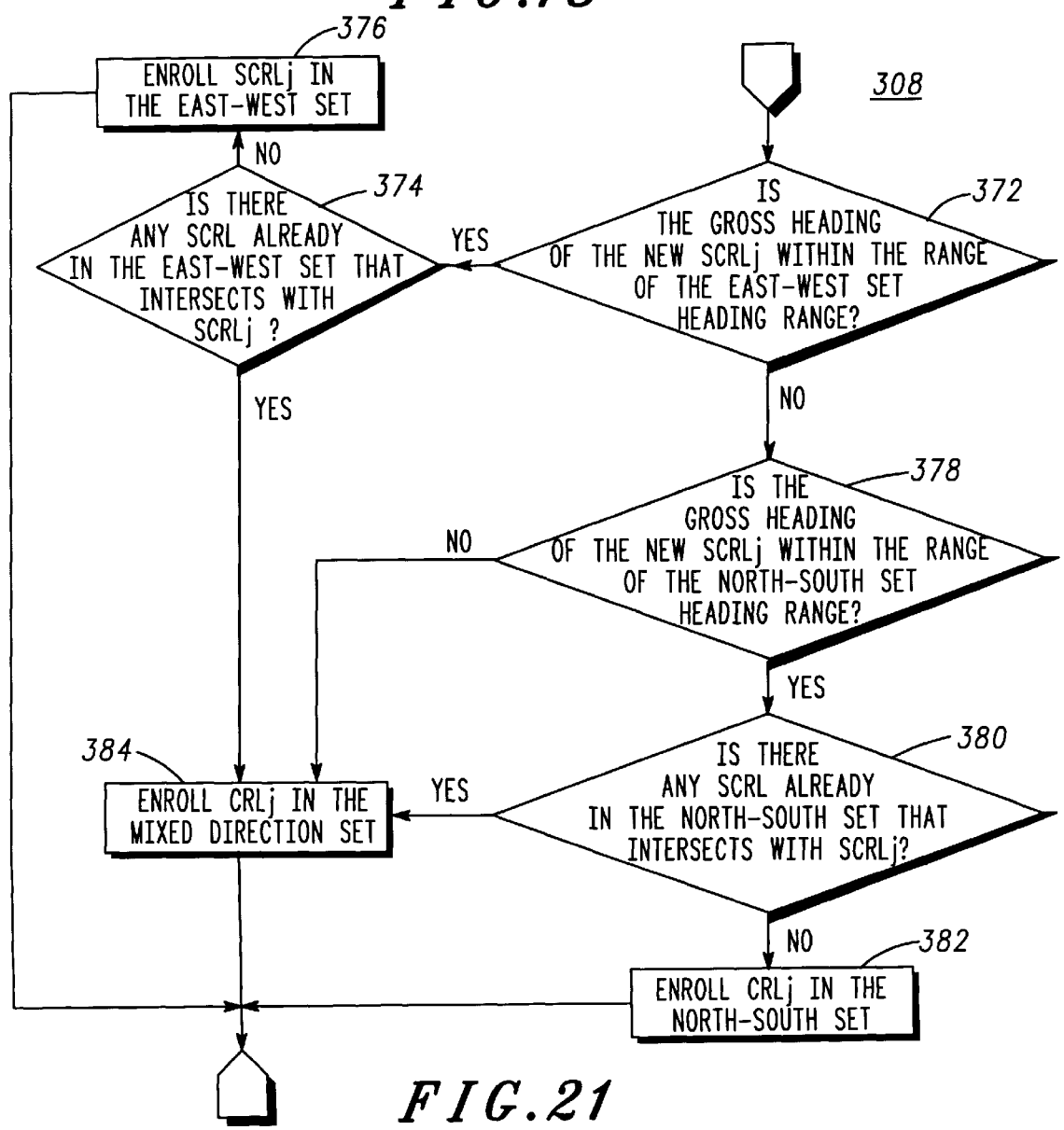
FIG. 18 is a table containing data representing the road segments of a road map in accordance with an embodiment of the present invention.

FIG. 18 illustrates an exemplary shape definition in the Shape Type Directory 210. Here, the shape definition is called the "nominal definition" because it relates to a nominal shape, scale, and orientation of the shape type. Each shape type (or shape class) is defined by its piecewise linear approximation; i.e., by the relative coordinates of its shape-points. The lines connecting the shape-points are presumed to be straight.

The piecewise linear approximation used in the Shape Type Directory 212 of FIG. 18 is equivalent to a similar shape in the original map, where it was used to represent curved road segments between adjacent intersections. Such an approximation was used in the set of the so called "shaped segments". The difference here is that by using the Shape Type Directory 212, the shape is defined only once regardless of how many such curved road segments were in the mapped area. Without this shape classification approach, the same piecewise linear approximation would have to be specified for each occurrence of any given shape, resulting in unnecessary redundancies in the decompressed database.

Consequently, the higher the ratio of the overall number of curved road segment lines to the number of shape types, the higher the compression ratio that can be achieved. The higher the compression ratio is, the smaller the relative number of the shape type definitions is and overall, less overhead is spent defining the shape types. This also means that the larger the tolerated variance between the classified shapes and actual curved road lines in a map, the higher the compression ratio.

A further way of improving the gain from the above described, shape-classification based compression approach is to apply it to all road lines and not just to curved portions of the road lines between intersections. Consequently, when forming composite road lines as described above, the iterative Degree of Freedom relaxation does not simply mean tolerating larger and larger differences in the road headings between two, adjacent straight-line road segments. What it also implies is that a higher degree of dissimilarity is tolerated between the shape of a shaped composite road line (SCRL) and a corresponding classified shape type.

As those skilled in the art will appreciate, the composite road line intersection computation algorithm depicted in FIG. 11 will change if we apply shaped composite road lines. The computation becomes more complex but can still be accomplished by applying known methods.

If the shape of the intersecting SCRL is represented by using linear approximation techniques in the Shape Type Directory 212 of FIG. 18, each of the intersecting SCRLs would have to be first decomposed into its component straight segments. If, on the other hand, the shape of the intersecting SCRL is defined by one or more equations, the intersection computation may be carried out using methods from analytic geometry. Then, the intersections of a given SCRL may be found, by computing the intersections of its component straight line segments using the procedure of FIG. 11.

Figure 19:
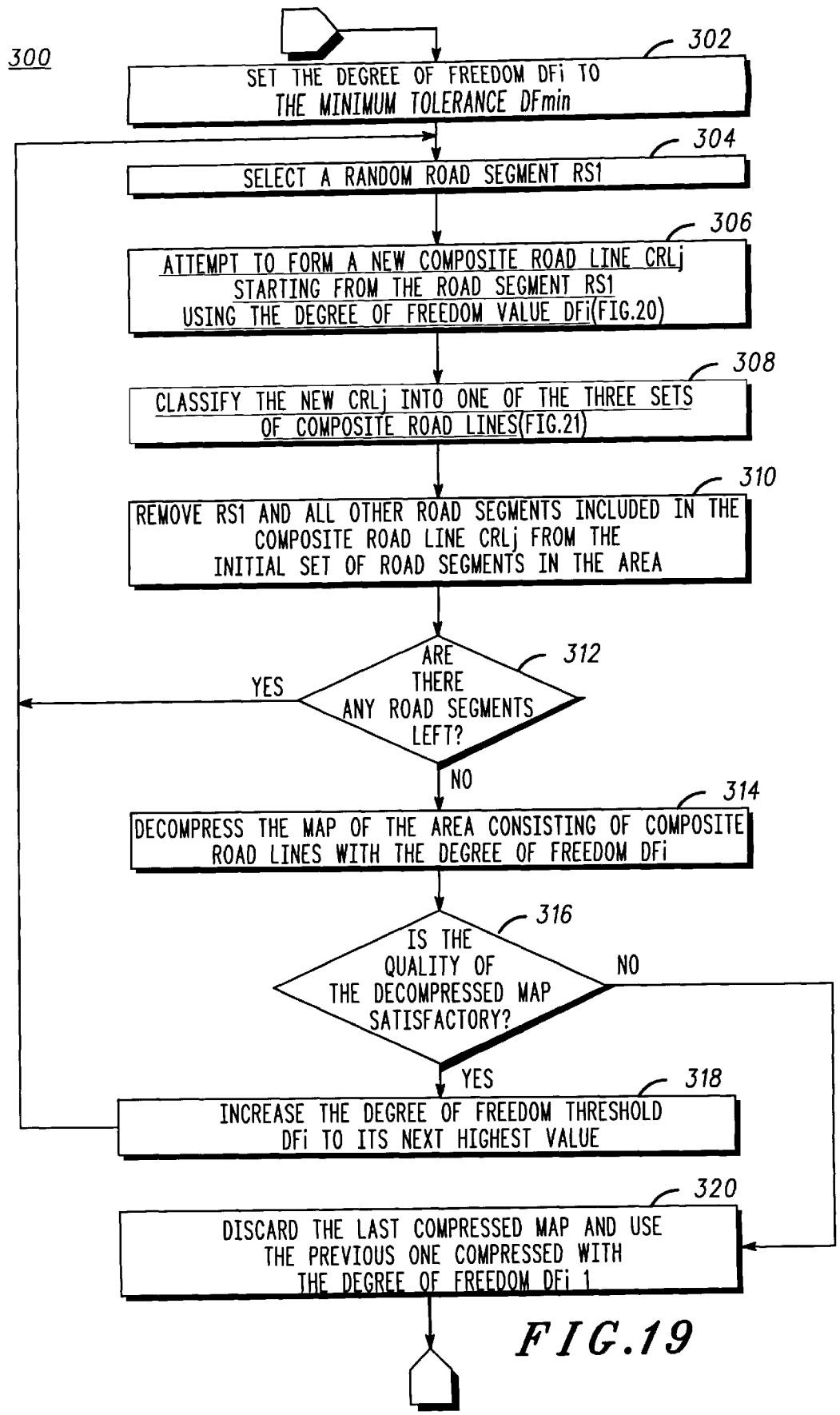
FIG. 19 is a flowchart of a method in accordance with an embodiment of the present invention.
Figure 20:
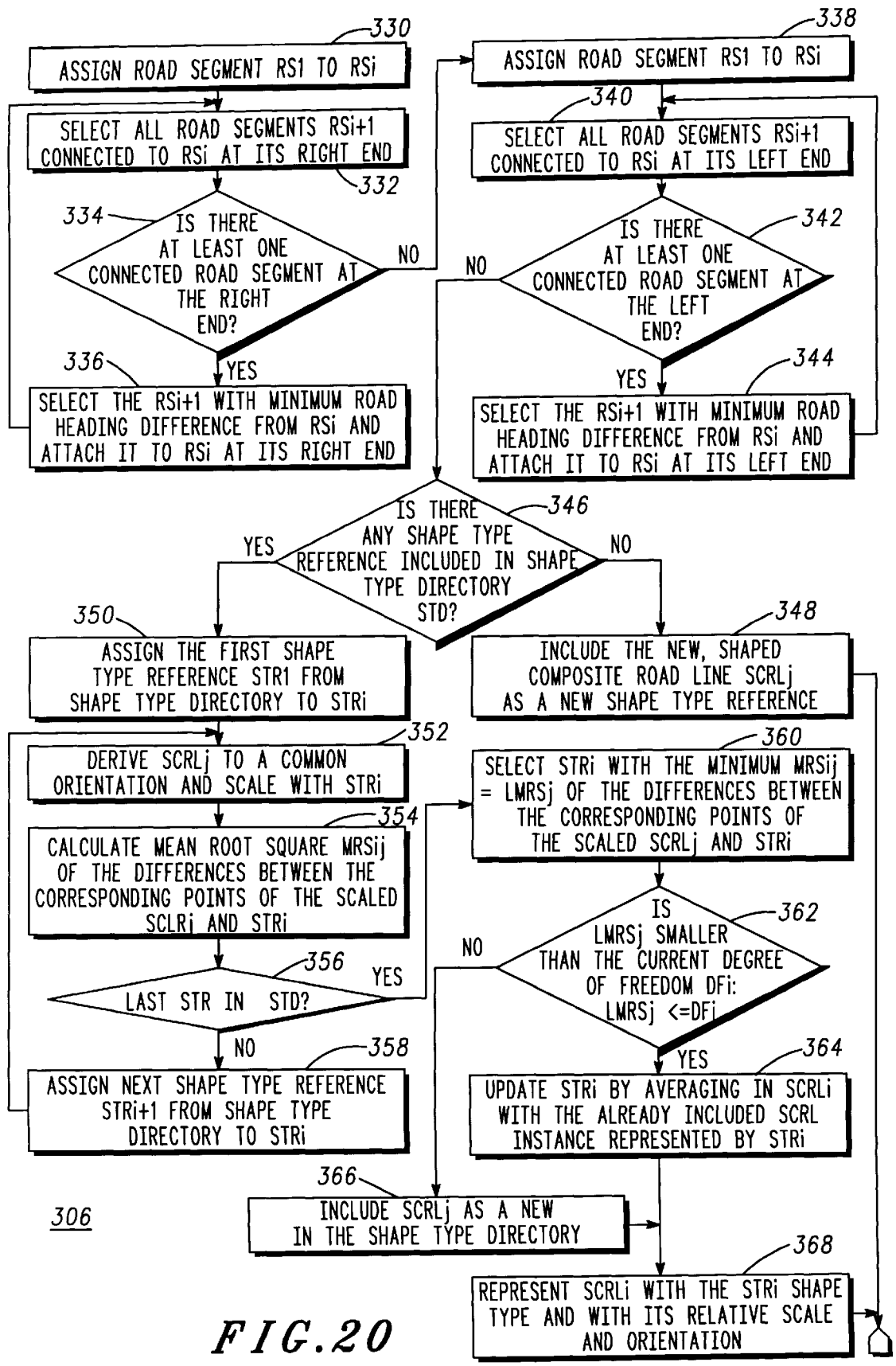
FIG. 20 is a flowchart of a step of the method of FIG. 19.

FIGS. 19–21 illustrate a preferred method for forming the SCRLs by matching them against the Shape Type Directory 212. The first three different sets of Composite Road Lines are also maintained here in order to reduce the search and intersection computation times during decompression. The fourth set that was reserved for the shaped segments only, is eliminated here since all Composite Road Lines can have shapes different from the straight line; thus, no special category is needed for this purpose. This organizational change is demonstrated by the method of FIG. 21. It is noted that the method shown in FIGS. 19–21 is very similar to that described above in connection with FIGS. 1–3.

The preferred method 300 for map compression using CRLs is shown in FIG. 19. Step 302 sets the degree of freedom, DF, equal to or greater than a predetermined minimum, DFmin, according to which road segment can vary from a given shape. Step 304 then randomly selects an elementary road segment, RS, from the uncompressed road network database. Step 306 attempts to form a new composite road line, CRL, starting from the road segment of step 304 using the DF value set in step 302. Step 306 is shown and explained below in detail with reference to FIG. 20. In order to reduce the decompression search and intersection computation time, the CRLs are grouped into three distinct sets 308, such that two of theses sets are non-intersecting. Step 308 is described in detail below with reference to FIG. 21.

Next, step 310 removes the road segment, RS, and all other elementary road segments absorbed in the composite road line, CRL, from an initial or remaining set of road segments in the uncompressed road-network database.

Step 312 determines if there are any elementary road segments remaining in the uncompressed database. If so, the process loops back to step 304; otherwise it continues on to Step 314. Step 314 decompresses the map area consisting of the composite road lines using the degree of freedom, DF.

Step 316 determines if the quality of the decompressed map is satisfactory. This determination is preferably done as explained with reference to FIG. 9. As those skilled in the art will appreciate, the quality of the compression can also be checked by exercising a given application with the decompressed map data and demonstrating if the performance is acceptable.

If the decompressed map is satisfactory then Step 318 increases the degree of freedom value, DF, to the next highest level and loops back to Step 304 to compress the road lines again. This process is repeated until the answer to Step 316 is no, in which case, Step 320 causes the most recent compressed map to be discarded or deleted from memory (not shown) and the previous compressed map using degree of freedom value DF to be adopted. Alternatively, the offending lines causing the unsatisfactory map quality are replaced with lines compressed with a lesser degree of freedom DF, as explained above for the straight composite road line compression in Step 28.

FIG. 20 illustrates in detail Step 306 of FIG. 19, which is a preferred method for forming composite road lines, each initiated from a corresponding initial road segment RS. Step 330 assigns the rightmost road segment on the CRL to RSi. Step 332 selects the cluster of all road segments RSi+1 connected to the right end of RSi. Step 334 then determines if there is at least one connected road segment at the right end of RSi. If the answer to Step 334 is yes, Step 336 selects the RSi+1 segment with the least road heading difference from RSi and attaches this segment to the right end of RSi. The process then loops back to Step 332 until the answer to Step 334 no.

If the answer to Step 334 is no, Step 338 assigns the first road segment in the CRL to RSi. Step 340 selects all road segments RSi+1 connected to the left end of RSi. Step 342 then determines if there is at least one connected road segment to the left end of RSi. If the answer to Step 342 is yes, Step 344 then selects the RSi+1 segment with the least road heading difference from RSi and attaches this segment to the left end of RSi. The process then loops back to Step 340 until the answer to Step 342 no.

When the answer to Step 342 is no, Step 346 determines if there are any of the same shape type references included in the shape type directory, STD. If the answer to Step 346 is no, Step 348 includes the new shaped composite road line, SCRL, as a new shape type reference and the method proceeds to Step 308. If Step 346 is yes, Step 350 assigns the first shape type reference from the STD as STR. Step 352 then derives SCRL to a common orientation and scale with STR by any commonly known techniques. Step 354 then calculates the mean root square, MRS, of the differences between the corresponding points of the scaled SCRL and STR, in order to quantify the similarity between the two shapes. The smaller the MRS value the more the two shapes are similar. Step 356 then determines if STR was the last STR in the STD. If Step 356 is no, step 358 assigns the next shape type reference from the STD as STR and loops back to Step 352.

If Step 356 returns yes, Step 360 selects the STR with the minimum MRS value representing the degree of dissimilarity between the SCRL and the entities in the STD. This minimum value is denoted as LMRS (Least Mean Root Square) function of the differences between the corresponding points of the scaled SCRL and STR. Step 362 then determines if LMRS is smaller than the current DF. If Step 362 returns no, Step 366 includes SCRL as a new STR in the STD. If Step 362 returns yes, Step 364 updates the STR by averaging in SCRL with the already included SCRL instances represented by STR. After Step 364 or Step 366, Step 368 represents in the compression method 300 the SCRL with the STR shape type, relative scale, and orientation. The method then proceeds to step 308.

FIG. 21 gives the details of step 308 of FIG. 19, a preferred method for classifying each composite road line, CRL, into one of three sets. Step 372 determines if the gross heading of the new SCRL is within the heading range of the East-West set. If step 372 returns yes, step 374 determines if there are any shaped composite road lines already in the East-West set that intersect the SCRL. If Step 374 returns no, Step 376 classifies the SCRL in the East-West set.

If Step 372 returns no, Step 378 determines if the gross heading of the new SCRL is within the heading range of the North-South set. If Step 378 returns yes, Step 380 determines if there are already composite road lines in the North-South set that intersect the new SCRL. If step 380 returns no, Step 382 classifies the SCRL in the North-South set. If Step 374 returns yes, or Step 378 returns no, or Step 380 returns yes, step 384 classifies the SCRL in the mixed direction set. After Step 376, 382, or 384 the process continues on to step 310.

As those skilled in the art will appreciate, the East-West and North-South designations are intended to be exemplary directions of CRLs. In general, CRLs can be two or more dominant directions, e.g., Southwest-Northeast and Northwest-Southeast.

After forming the four set of segments further optimization is possible. In fact, segments may be migrated to the two non-intersecting sets from the other two sets in order to increase the size of the non-intersecting sets and thus CPU load during decompression. Also, more than four segment sets could be defined with more than 2 non-intersecting sets.

This classification method of step 308 uses the "gross" heading of the Shaped Composite Road Line. This is necessary since only straight-line Composite Road Lines have an unambiguous heading value. The gross heading of a shaped CRL is calculated by:

dividing the line into n equal-length portions, calculating the heading of each portion separately by determining the heading of the straight line connecting the two end-points of the portion, and calculating the average of the n heading values of each component portion.

The end result of applying this method 300 is, in most instances, a significantly smaller number of Shaped Composite Road Lines than the number of straight Composite Road Lines are applied in the method of FIG. 1.

The above described method of using shape types and shape type directories to reduce the storage need for representing composite road lines of various shapes is especially advantageous to apply in distributed computer networks where the target nodes support a uniform virtual machine and programs are downloaded from remote server locations on-demand to run on these virtual machines. The most popular architecture with such features is the "Java" virtual machine capable of running remotely down-loaded "applets".

For such distributed platforms, the shape type directory does not need shape definition data such as the linear approximation method shown on FIG. 18. Instead, the shape definition can be accomplished by a programmed function that can be downloaded as an applet to the remote client node accompanying the actual compressed map data. The shape definition applet performs the decompression of every road line data of the specific shape type and it is capable of running on any client computer of the network that supports the uniform virtual machine for such applets. In other words, the shape definition approximation data in the shape type directory is replaced by a pointer (a reference) to the decompression applet.

The use of the shape decompression applets can support a much greater variety and complexity of shape types. Therefore, it reduces the overall number of composite road lines in the compressed image. The decompression code storage is also optimized, because a specific shape decompression can be downloaded only if the accompanying compressed map data contains shapes that need such shape decompression. Naturally, this programmatic shape decompression method is also applicable if no virtual machine is supported on the client node computers. However, a uniform virtual machine significantly enhances the applicability of this method.

3.0 Reduction of the End Point Representation Cost by Baselines

Figure 22A:
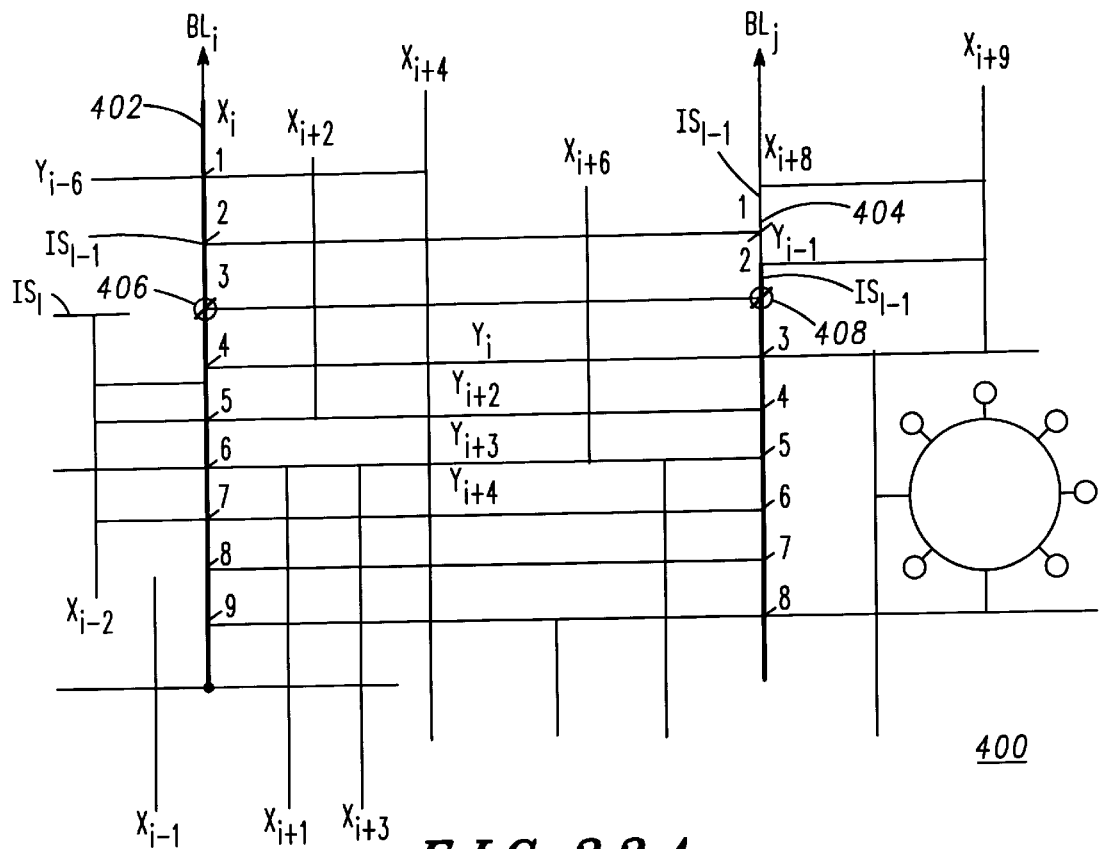
FIG. 22A is diagram of a road map to be represented by another embodiment of the present invention.

The simplest, topology-driven way of reducing the end-point representation cost is replacing coordinate values with short references to known positions, the coordinates of which have already been defined at other locations of the road-map topology. This can be done when an endpoint is anchored at another composite road line which then becomes the "baseline" of the former composite line with its endpoints to be defined. Typically, the baseline composite line belongs to a set other than that of the composite road lines that intersect it. East-West composite lines have their baselines belonging to the North-South set of composite road-line and vice-versa. FIG. 22A illustrates how such an arrangement can reduce the end-point representation storage need. Composite road-lines Xi through Xi+n form the North-South set of composite lines and Yi through Yi+n form the East-West set of composite lines.

The end-points of the composite road-line Yi of map 400 can be defined by references to its baselines 402 and 404 (also composite road lines Xi and Xi+8, respectively) without actually specifying Yi's end-point coordinate values. This composite line is defined by a data structure consisting of six data fields of four bits each, see FIG. 22B.

The first field holds the component type definition code. A code value of 0101 could signify a composite line definition by baseline end-point definitions at both end-points. This code also implies that there are less then 16 intersections of this composite road-line and on both of Yi's baselines. As a result, a four bit long field is sufficient to use to determine an intersection number within this data structure. The type code also implies that there are no more than 16 baselines in the North-South set of the composite road-lines and a four bit long field is also sufficient for designating a baseline for end-point definition.

The second and third four bit fields determine the West end-point 406 of Yi and the third and fourth four bit fields determine the East end-point 408 of Yi. The West end-point 406 is at the third intersection of the North-South Baseline 402 and the East end-point 408 is at the second intersection of the North-South Baseline 404. See steps 460 and 464 of FIG. 25.

The last four bit field defines the number of intersections with the composite road-line Yi itself. In addition to its two endpoint baselines 402 and 404, Yi has three more intersections with three composite road-lines from the North-South set (Xi+2, Xi+4, and Xi+6). In this example, Yi is a straight-line composite road-line and the number of intersections is captured in the compressed representation in order to efficiently limit the search for intersecting road lines at decompression-time.

For the end-point representation of Yi only 16 bits were used as opposed to 48 bits that would have been needed for representing 12 bit long coordinate value fields. In the case of using 16 bit long coordinate fields, 64 bits would have been needed. The field length for defining a coordinate value depends on the geographical size of the map parcel to be compressed. As a result, the baseline end-point representation saved between 67% and 75% memory as compared to the method of explicit end point coordinate representation with no base line references.

The savings further increase when the road attribute information for all or for most composite road lines originating from a common baseline is identical so that it does not have to be repeatedly defined for each composite line. This type of attribute sharing extensions could be added to the compression and decompression algorithms by using techniques that are commonly known by those skilled in the art.

Figure 22B:
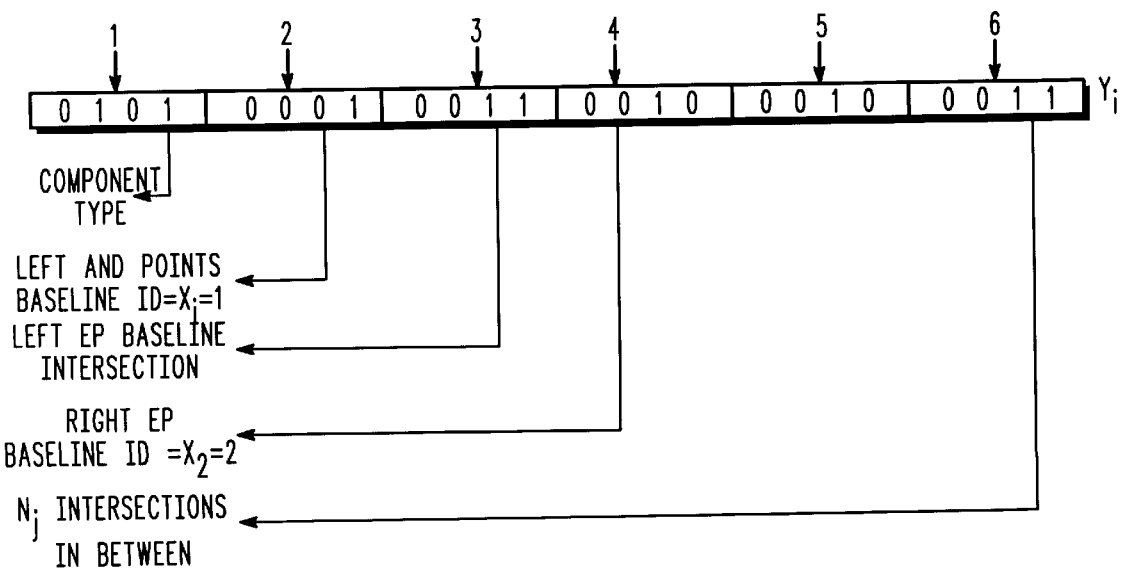
FIG. 22B is a diagram of a compressed data structure representing a road line depicted on FIG. 22A

The flow-charts of FIGS. 23–26 illustrate how a preferred compression method will recognize a baseline scenario and produce data structures such as illustrated in FIG. 22B and how a preferred decompression method will interpret these data structures.

Figure 23:
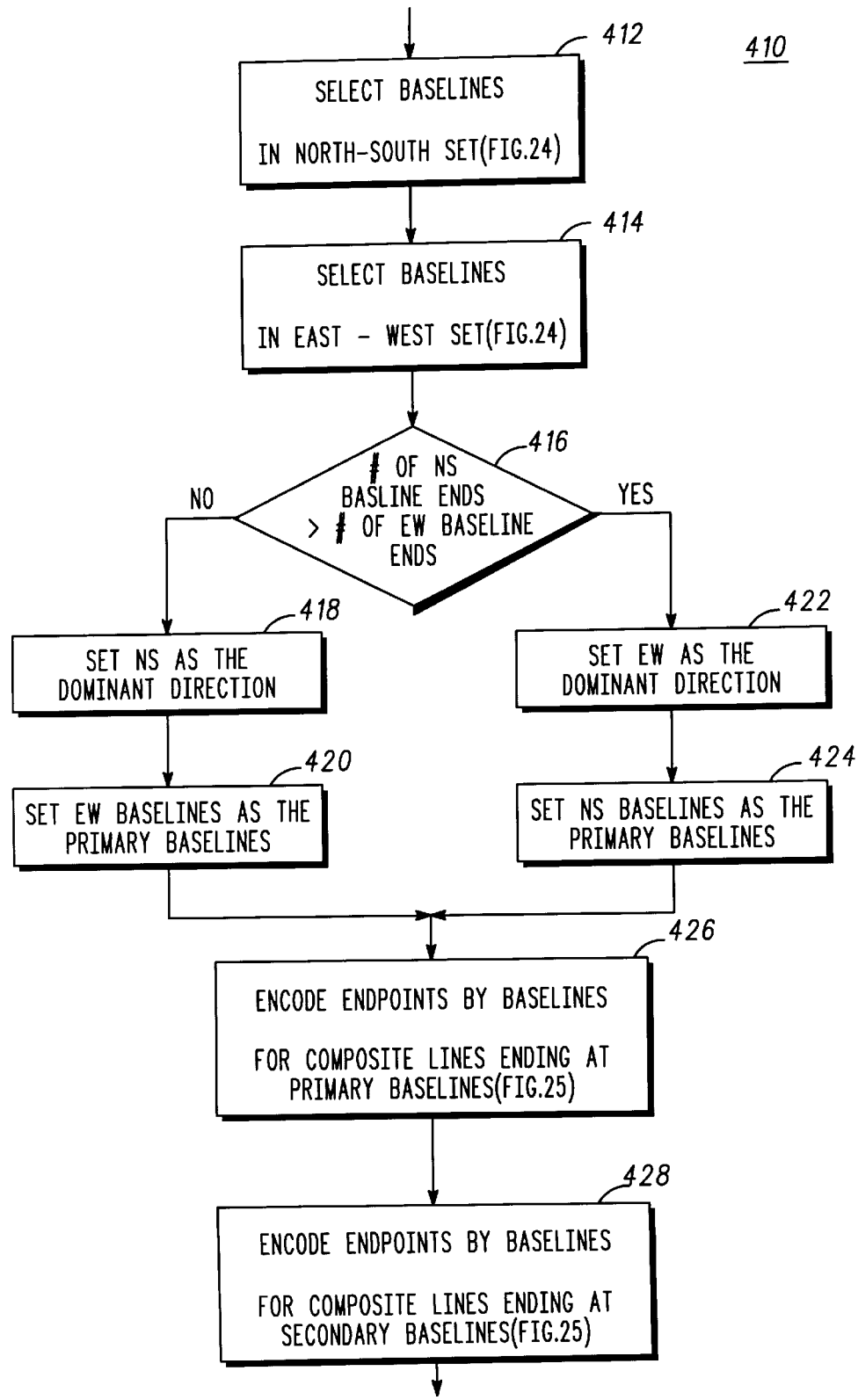
FIG. 23 is a flowchart of a method in accordance with another embodiment of the present invention.

The compression with baselines starts with a statistical analysis which is performed for selecting a dominant direction in different sections of the map. This can be done while the sets of composite road-lines are formed as described with respect to FIG. 1 or subsequently, in a separate phase. The method illustrated in FIG. 23 depicts this process as a separate phase. The dominant direction can be North-South or East-West. In the dominant direction, there is a higher density of composite lines that have one or both of their endpoints anchored on a primary baseline in the set of the other direction.

Primary baselines are defined as lines perpendicular to the dominant direction that run through some of the endpoints of the dominant direction lines. The compression algorithm will look for a hierarchy of baselines. In the first pass, the primary baselines are determined. Lines connecting or intersecting the primary baselines may form secondary baselines if they run through the endpoints of lines in the direction of the primary baselines.

In the compressed image of the first pass, all primary baselines and all composite road segment lines that do not have their endpoints on any baseline are defined by their explicit endpoint coordinate values. Each line has the number of its intersections also defined. In addition, baselines also specify the spacing between their intersections that also represent endpoints of other lines of the perpendicular direction. All lines having their endpoint(s) on baselines will define their endpoints relative to the baseline. A baseline relative endpoint is defined by the baseline index and by the sequence number of the intersection where the endpoint is located on the baseline.

If both endpoints are defined by baselines, only the first baseline index is specified explicitly. The second baseline can be defined by an index increment only relative to the first baseline. See steps 470 and 472 in FIG. 25. If several, adjacent lines have their endpoints on the same baselines, the baseline intersection reference can also be saved entirely from the endpoint definition data. In these cases, the endpoint sequence number is implied (see steps 458 and 466 in FIG. 25), meaning that it is the next one after the endpoints of the previous line ending at the same baseline in the sorted list of composite segment lines belonging to the same directional set. These two techniques would result in further compression improvements in addition to the estimates provided above with the explanation of FIG. 22B.

Method 410 of FIG. 23 begins with step 412 selecting baselines in the North-South set. Step 414 then selects baselines in the East-West set. The details of steps 412 and 414 are set forth below. Step 416 then determines if the number of North-South baselines is greater than the number of East-West baselines. If step 416 is no, step 418 sets the North-South set as the dominant direction. Next, step 420 sets the East-West baselines as the primary baselines. If step 416 is yes, step 422 sets the East-West set as the dominant direction and step 424 sets the North-South baselines as the primary baselines. After step 420 or 424, step 426 encodes endpoints by baselines for composite lines ending at primary baselines and step 428 encodes endpoints by baselines for composite lines ending at secondary baselines. Steps 426 and 428 are described below in detail.

Figure 24:
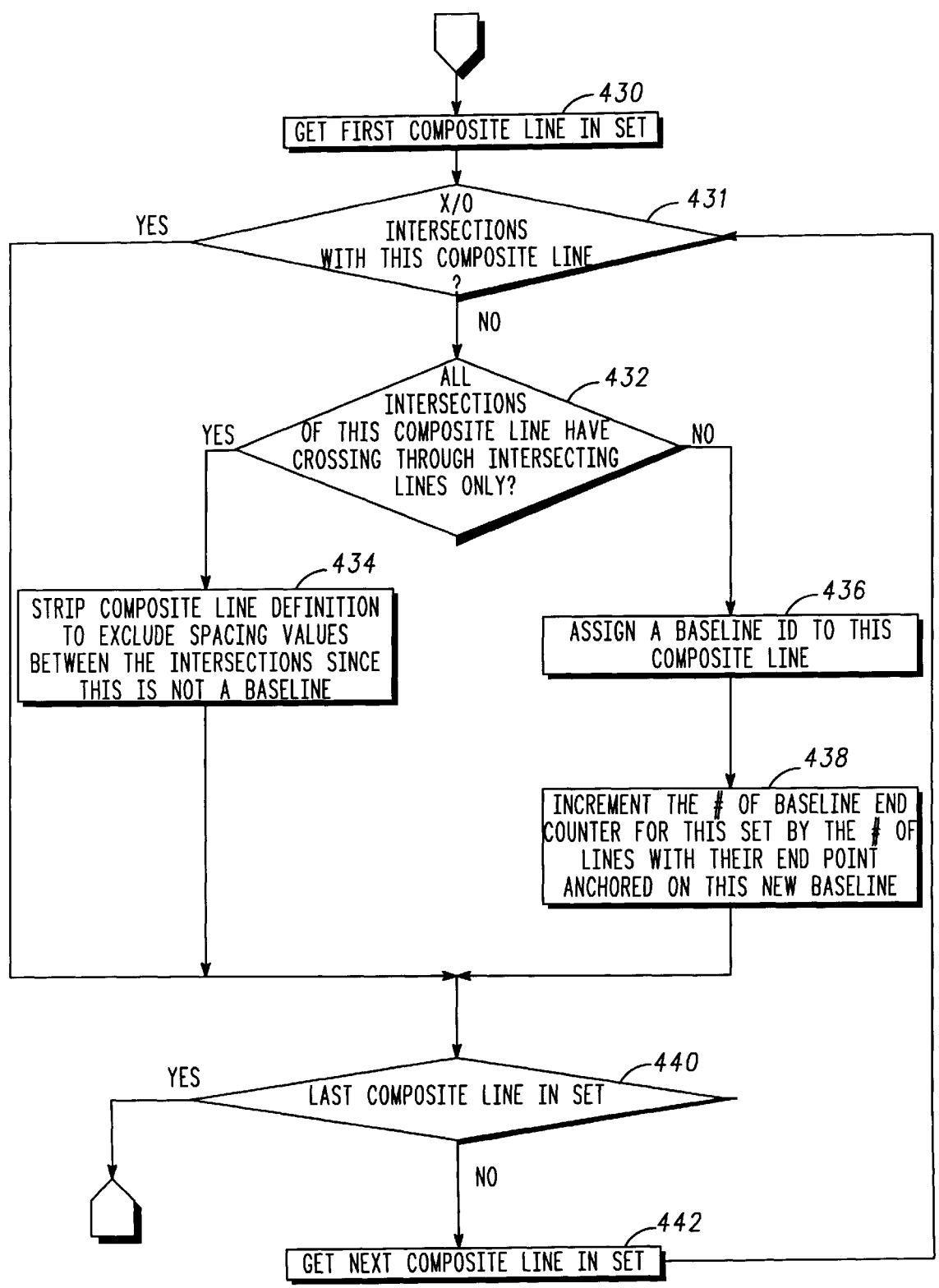
FIG. 24 is a flowchart of a step of the method of FIG. 23.

The preferred steps 412 and 414 to select baselines are shown in FIG. 24. Step 430 gets a first composite line in one of the North-South or East-West sets corresponding to the step 412 or 414. Step 431 determines if there are no intersections with this composite line. If step 431 is no, step 432 determines if all intersections of this composite road line have crossings through only intersecting lines. If step 432 is yes, this means that none of the composite road lines of the opposite direction set are anchored at this composite road line, i.e. this is not a base line. If step 432 is yes, step 434 strips the composite line definition to exclude the spacing values between the intersections because this composite road line is not a baseline. If step 432 is no, step 436 assigns a baseline identification to this composite line and step 438 increments the number of baseline end counter for this set by the number of lines with their endpoints anchored on this new baseline.

The baseline end counter is used in step 416 to determine the dominant direction. If step 431 is yes or after step 434 or step 438 step 440 determines if this is the last composite line is the set. If step 440 is yes, the method continues on to step 414 or to step 416 depending on where in the method 410 the routine is operating. If step 440 is no, step 442 gets the next composite road line in the set and loops back to step 431.

Figure 25:
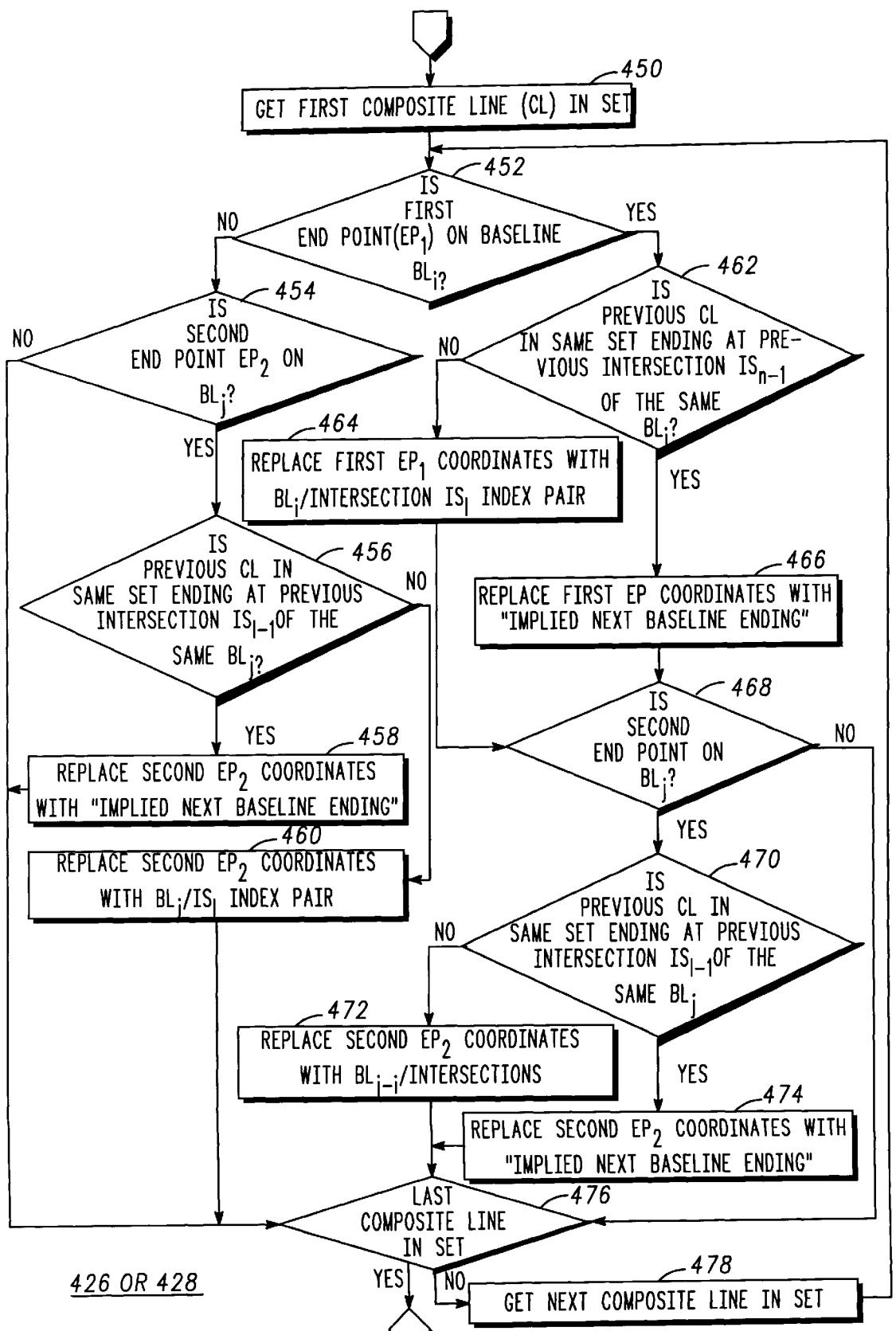
FIG. 25 is a flowchart of a step of the method of FIG. 23.

The preferred steps 426 or 428 to encode end points by baselines are shown in FIG. 25. Step 450 gets the first composite line (CL) in the set. The set will be one of East-West or North-South sets depending on which set was chosen as the primary baselines in the earlier steps of FIG. 23. Step 452 then determines if the first endpoint (EP1) is on a baseline (BLi). If step 452 is no, step 454 determines if the second end point EP2 is on another baseline BLj at its intersection ISl. If step 454 is yes, step 456 determines if the previous CL in the same set is ending at the previous intersection ISl−1 of the same BLj of step 454. If step 456 is yes, step 458 replaces the EP2 coordinates with an implied next baseline ending. This means that field 3 of FIG. 22B is eliminated and the use of the "Implied Not Baseline Ending" technique is encoded in the component type field (field 1of FIG. 22B). If step 456 is no, step 460 replaces EP2 coordinates with the BLj/ISl index pair.

If step 452 is yes, step 462 determines if the previous CL is in the same set ending at a previous intersection ISk−1 of the same BLi of step 452. If step 462 is no, step 464 replaces the first EP1 coordinates with BLi/ISk index pair. If step 462 is yes, step 466 replaces the first EP1 coordinates with "Implied Next Baseline Ending". After step 464 or 466, step 468 determines if the second endpoint EP2 is on BLj. If step 468 is yes, step 470 determines if the previous CL in the same set is ending at the previous intersection, ISl−1, of the same BLj. If step 470 is no, step 472 replaces the EP2 coordinates with BLj−i/ISk. Coordinate value BLj−i denotes baseline, BLj, relative to the first end point baseline, BLi. If step 470 is yes, step 474 replaces the EP2 coordinates with "Implied Next Baseline Ending". If steps 454 or 468 are no or after steps 458, 460, 472, or 474, step 476 determines if this is the last composite line in the set. If step 476 is yes, the method ends and returns to the appropriate next step. If step 476 is no, step 478 gets the next composite line in the set and loops back to step 452.

As can be seen from the description of FIG. 26 below, a preferred decompression method 500 first defines the endpoints ending at the primary baselines, then the lines of the perpendicular direction that have their endpoints at the secondary baselines. Finally, composite lines of the third set have their baseline endpoints replaced with their coordinate values. This is accomplished by invoking the baseline expansion method of FIG. 26 three times for the three sets of composite lines in the above order.

Figure 26:
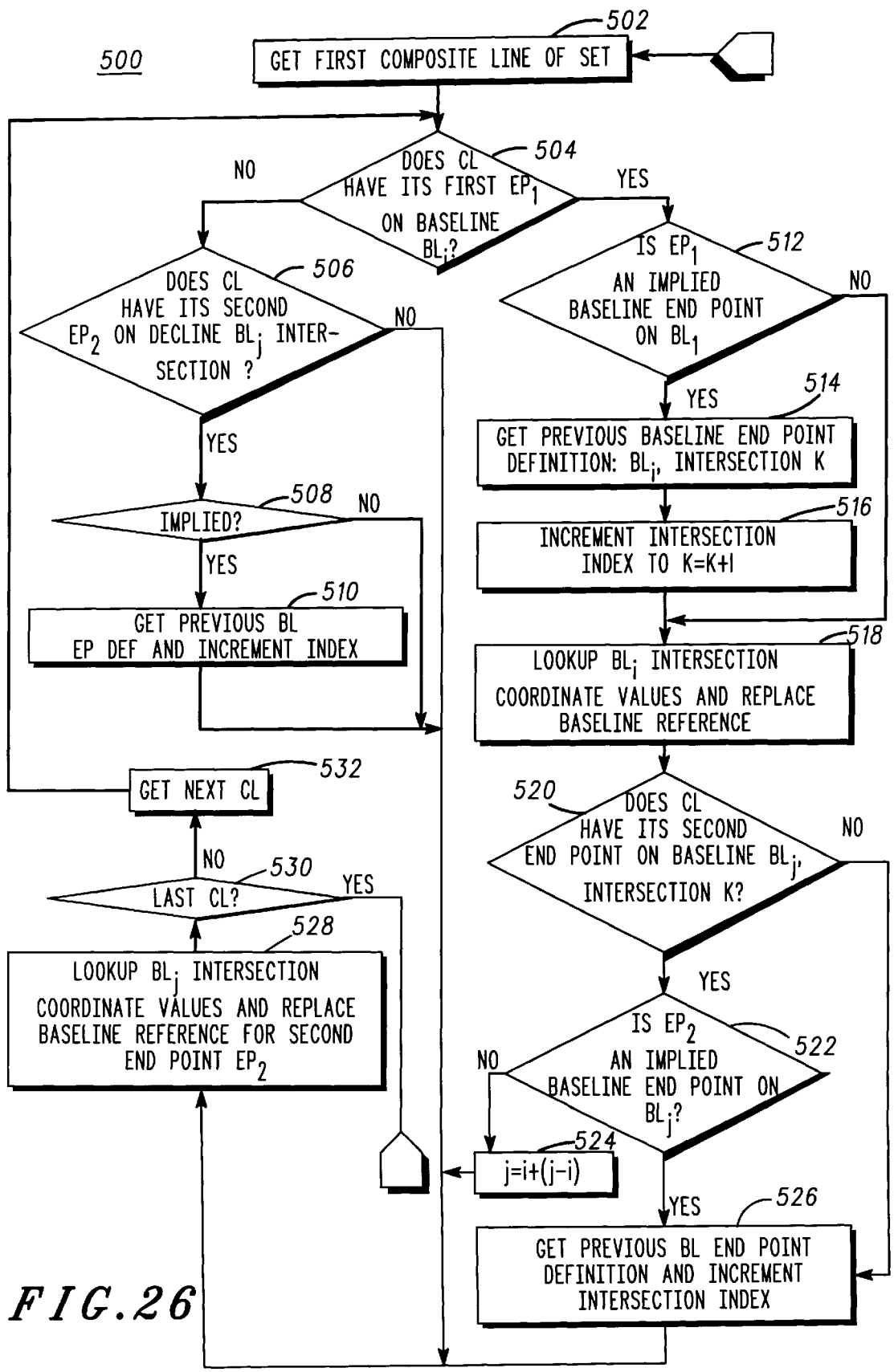
FIG. 26 is a flowchart of a method utilizing the methods of FIGS. 23–25.

FIG. 26 sets forth a preferred method 500 for expanding baseline endpoints while decompressing composite lines of a set. Step 502 gets the first composite line of the set. Step 504 then determines if the CL has its EP1 on baseline BLi. If step 504 is no, step 506 determines if the CL has its EP2 on baseline BLj, Intersection m. If step 506 is yes, step 508 determines if this intersection ISm is an implied intersection built in steps 458 or 466. If step 508 is yes, step 510 gets the previous EP definition for the same BLj base line and increments the intersection index.

If step 504 is yes, step 512 determines if EP1 has an implied baseline endpoint on BLi. If step 512 is yes, step 514 gets the previous baseline endpoint definition of BLi, Intersection k. Step 516 then increments the intersection index to k=k+1. After step 516 or if step 512 is no, step 518 looks up the BLi intersection coordinate values and replaces the baseline reference with the coordinate values fetched from the lookup table. The construction of such a lookup table is not shown on the flow-charts but those skilled in the art will appreciate this technique to build the lookup table from the compressed baseline definition which also has encoded the spacing distance values between its intersections. Step 520 then determines if the CL has its second endpoint EP2 on baseline, Blj, ISm. If step 520 is yes, step 522 determines if EP2 is an implied baseline endpoint on BLj. If step 522 is no, step 524 sets j=i+(j−i) and if step 522 is yes, step 526 gets the previous BL endpoint definition and increments the intersection index. If step 506 is no, or step 508 is no, or after step 510, or if step 520 is no, or after step 524 or 526, step 528 looks up the BLj intersection coordinate values from the look up table built from the base line definition and replaces the base line reference for the second end point EP2. Step 530 determines if this is the last CL of the set. If step 530 is no, step 532 gets the next CL and loops back to step 504. If step 530 is yes, then the baseline expansion for the current set of composite road lines is completed and the method repeats until each of the three sets of base lines are completed.

For some applications (e.g. positioning map-matching, route planning), only lines of a certain heading range and perhaps, their intersections are relevant in a certain area and at a certain time. In this case, first the baselines in the perpendicular to the dominant heading range are located for the area. Then the lines originating at those baselines are considered. If still more lines are expected, the sorted list of lines with explicit endpoint coordinates are searched for the given heading range. Often, there is no need for a subsequent search, because the number of (intersecting) lines are limited by the intersection number definition in the composite road line where the vehicle is believed to be traveling and all expected intersections were found by traversing the baselines.

Figure 27:
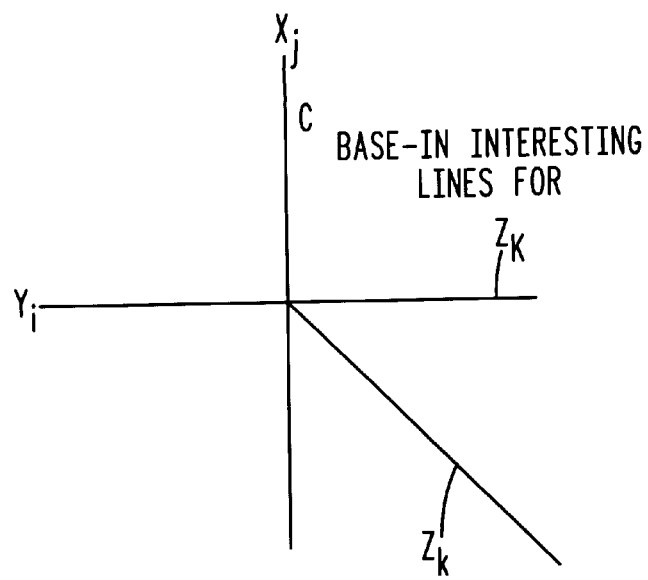
FIG. 27 is an illustration of another case described in the method of FIG. 23.
Figure 28:
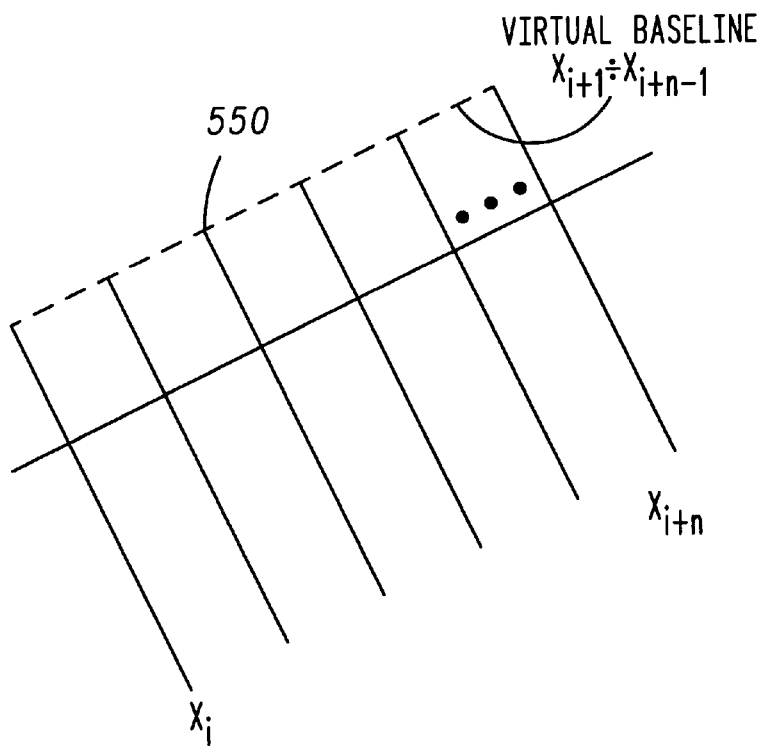
FIG. 28 is an illustration of yet another embodiment of the present invention; and Table 1 is an illustration of the storage savings of one embodiment of the present invention compared to a prior art compression method.

The technique of using baselines for compressed endpoint representation can be extended to other, similar topologies. This is illustrated in FIGS. 27 and 28, FIG. 27 depicts a scenario when a composite road-line, Zk, from the third set originates at the intersection of two other composite road-lines Xi and Yj. The end-point of Zk can be similarly defined to the end-point definition of Yi on FIG. 22A according to FIG. 22B, even if none of the intersecting composite road-lines Xi and Yj on FIG. 27 were designated as baselines. The difference is that instead of a baseline identification field and a baseline intersection number field in FIG. 22B, the two base-intersection composite road-line identification fields referring to Xi and Yj are used to define the endpoint of Zk. In the decompression method, the end-point of Zk is simply defined as the intersection of Xi and Yj. Consequently, Xi and Yj do not have to have the spacing values between their adjacent intersections defined as the baseline definitions do in the compressed image.

Depending on the number of composite road lines, baselines and base-intersection composite road-lines in a particular parcel, the compression method determines the optimal field length for referring to Xi and Yj as less than, equal to or more than the field length for the baselines. If numbering the regular baselines and the base-intersection composite road-lines requires the same field length as the regular baseline numbering and there are not too many of the latter type of road-lines in a parcel, the two should share the same identification number sequence and the field length does not change in the compressed end-point representation for Zk.

If adding the base-intersection composite road-lines to the regular baselines would increase the length of the baseline field or if the number of the occurrences of the former type in a parcel justifies a separate sequencing arrangement, the field length of referring to a base-intersection composite road-line is typically less than the regular baseline identification field length because there are more regular baselines likely to be found in a parcel than base-intersection lines. Finally, if only a few base-intersection end-point definitions are used in a parcel but they would increase the regular baseline identification field length, it is not efficient to open a new numbering sequence for them and they will be referred to by their regular composite road-line identification, which typically needs a longer identification field length since there are normally significantly more regular composite road-lines in a parcel than regular baseline road-lines When the compression method makes a selection for the sequence numbering arrangement for the base-intersection lines, it encodes this selection in the parcel header. Naturally, the compression method may decide to use only one sequence numbering arrangement for all parcels, even if it is not an optimal selection for some parcels. If the compression method does not find a significant number of base-intersection lines, the impact of the selection may be negligible.

In FIG. 28, the end-points of the composite road-lines Xi and Xi+n define a virtual baseline 550. The end-points of the composite road-lines Xi-:-Xi+n are not anchored on any composite road-line but still, a single straight line can be drawn through them which becomes the virtual baseline 550 for their end-point definition. The virtual baseline 550 does not have to define its end-point coordinates explicitly or by referring to other, regular baselines. It is sufficient to refer to the two terminating composite road-lines Xi and Xi+n. The compression method justifies the cost of establishing a virtual baseline 550 if n is a sufficiently large number, i.e. a sufficiently large number of composite road-lines Xi+1-:-Xi+n−1 will benefit from this virtual baseline by their reduced end-point representation cost.

While a specific embodiment of the present invention has been shown and described, further modifications and improvements will occur to those skilled in the art. For example, while the invention has been described in the context of road map data the invention could equally apply to power line or telephone line networks. All modifications that retain the basic underlying principles disclosed and claimed herein are within the scope of the present invention.

TABLE 1

|  | Nr of constructs in Chicago | Size in bytes/1 UDB construct | Σ Size in Chicago | % Size in UDB |
| --- | --- | --- | --- | --- |
| Segments | 236,075 | 40.00 | 9,443,000.00 | 67% |
| Nodes | 200,612 | 12.00 | 2,407,344.00 | 17% |

TABLE 1-continued

| | | | | |
|---|---|---|---|---|
| Shape Points | 420,144 | 5.33 | 2,239,367.52 | 16% |
| ΣΣ Uncompressed Size in Chicago | | | 14,089,711.52 | 100% |

| | Nr of constructs in Chicago | CDB construct size in bytes | Σ Size in Chicago | % Size in CDB |
|---|---|---|---|---|
| Segments | 236,075 | 4.38 | 1,032,828.13 | 51% |
| Nodes | 200,612 | 0.00 | 0.00 | 0% |
| Shape Points | 420,144 | 2.40 | 1,008,345.60 | 49% |
| ΣΣ Compressed size in Chicago | | | 2,041,173.73 | 100% |

What is claimed is:

1. A digitized topology data compression and decompression method comprising the steps of:
providing the digitized topology data of a collection of a plurality of segments connected to each other via nodes wherein each node connects one of at least two adjacent segments and an end of one segment;
forming at least one composite line representing a chain of connected segments, thereby reducing an overall number of lines needed to represent the collection of segments wherein each composite line has two end points at known coordinates, thereby compressing the topology data;
representing each composite line by its respective end point coordinates;
enrolling each composite line into one of at least two sets of composite lines for minimizing a number of intersections between each of the composite lines within each of the sets of composite lines; and
reconstructing the nodes at a decompression time by calculating coordinates of intersecting composite lines belonging to different sets of composite lines, thereby decompressing the topology data.

2. The method of claim 1, further including the steps of:
selecting a first composite line as a baseline from one of the two sets of composite lines;
selecting a second composite line from the other set of composite lines such that the second composite line has an endpoint on the baseline; and
replacing one of the end point of the second composite line with an index to the baseline.

3. The method of claim 2, further including the steps of:
assigning to each segment a number of attributes;
packaging a set of attribute combinations in the composite lines with an end point on the baseline in an attribute control block;
flagging a composite line with the set of attribute combinations thereby signifying an inheritance of attributes in the attribute control block;
flagging a composite line with a set of attribute combinations identical to a set of baseline attribute combinations thereby signifying an inheritance of the baseline attribute combinations; and
flagging a composite line with a set of attribute combinations identical to a set of attribute combinations of a previous composite line in an ordered sequence of the composite lines with an end point on the baseline thereby signifying an inheritance of the set of attribute combinations assigned to the previous composite line.

4. The method of claim 1, wherein the step of forming a composite line further includes the steps of:
forming the composite lines into straight composite lines; and
limiting a variation in a road-heading of the connected segments constituting each straight composite line by a degree of freedom threshold value.

5. The method of claim 4, further including the steps of:
performing an initial compression with the degree of freedom threshold value set to a minimum;
decompressing the compressed topology data containing the straight composite lines;
checking the decompressed topology data against a predetermined set of criteria for preventing information loss; and
repeating compression and decompression until a maximum degree of freedom threshold value is reached that still meets the set of criteria for preventing information loss.

6. The method of claim 5 wherein preventing information loss includes the step of preventing a loss of connectivity between one composite line end point anchored on another composite line.

7. The method of claim 1, further including the step of maintaining a road-heading of the segments constituting each composite line.

8. The method of claim 7, further including the step of forming a composite line by representing the nodes in the composite line by each node's coordinate values at an end point of the composite line.

9. The method of claim 8, further including the step of forming a composite line by representing the nodes in the composite line by a differential encoding of each node's coordinate values.

10. The method of claim 1, further including the steps of:
forming a second composite line representing a chain of connected segments for reducing the overall number of the composite lines in the topology data;
enrolling the second composite line into a third set of composite lines having no limitation on a number of intersections of the composite lines within the third set and between the third set and the at least two sets of composite lines; and
reconstructing the nodes at the decompression time by calculating coordinates of intersecting composite lines from the third set.

11. The method of claim 10 further includes the steps of:
selecting the second composite line such that its end point falls on an intersection of another composite line belonging to the first set and yet another composite line belonging to the second set, respectively; and replacing end point coordinate values of the second composite line with indices to the intersecting composite lines.

12. A digitized topology data compression and decompression method comprising the steps of:

providing the digitized topology data of a collection of segments connected to each other via nodes wherein each node connects one of at least two adjacent segments and an end of one segment;

forming a plurality of composite lines representing a chain of connected segments thereby reducing an overall number of lines needed to represent the collection of segments;

providing at least one reference composite line for forming a set of reference composite lines wherein each reference composite line has a different shape;

matching the shape of each composite line formed to each shape in the set of reference composite lines;

providing a description of each composite line as a shape type when a similarity between a topology of the shape of the composite line and one of the reference composite lines satisfies a predetermined criteria;

encoding the shape type as an identifier of a matched reference composite line, a scaling factor for determining a length of the matched composite line, and a heading factor for determining an orientation of the composite line;

enrolling each composite line into one of at least two sets of composite lines for minimizing a number of intersections between composite lines within the same set thereby compressing the topology data;

reconstructing each composite line from the matched reference composite line at a decompression time using the composite line's encoded shape type and by scaling a size of the matched reference composite line by the scaling factor and by rotating the matched reference composite line by the heading factor; and reconstructing the nodes at the decompression time by calculating coordinates of intersecting reconstructed composite lines belonging to different sets of composite lines.

13. The method of claim 12 further including the steps of:

defining the shape of each set of reference composite lines as a reference to a programmed function;

downloading the programmed function and the compressed topology data in a computer network to a target site; and executing on the target site at the decompression time a reconstruction of a shape.

14. A digitized topology data compression and decompression method comprising the steps of:

(a) providing the digitized topology data of a collection of segments interconnected via nodes;

(b) forming a plurality of composite lines representing multiple segments beginning from a randomly selected segment and including connected segments within a known degree of freedom;

(c) classifying each of the composite lines as one of at least two types thereby compressing the topology data;

(d) repeating steps (a)–(c) until all the segments are classified; and (e) decompressing the topology data by representing the topology data as the plurality of composite lines.

15. The method of claim 14 further including the steps of:

(f) checking a quality of the decompressed topology data; and (g) increasing the degree of freedom and repeating steps (b), (f) when the quality of step (f) is acceptable.

16. The method of claim 14 wherein step (c) further includes the steps of:

selecting as baselines certain composite lines of each of the type classes;

determining which type class has a greater number of baselines;

setting the baselines of the type class with the greater number of baselines as primary baselines; and encoding an endpoint of each composite line ending at one of the primary baselines.

* * * * *